(12) United States Patent
Hwang et al.

(10) Patent No.: US 11,422,650 B2
(45) Date of Patent: Aug. 23, 2022

(54) TOUCH DISPLAY DEVICE AND A TOUCH SENSING METHOD OF THE SAME USING A SENSING TRANSISTOR

(71) Applicant: LG Display Co., Ltd., Seoul (KR)

(72) Inventors: KwangJo Hwang, Paju-si (KR); HongChul Kim, Seoul (KR); YongChan Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 59 days.

(21) Appl. No.: 16/901,799

(22) Filed: Jun. 15, 2020

(65) Prior Publication Data

US 2021/0064170 A1    Mar. 4, 2021

(30) Foreign Application Priority Data

Aug. 30, 2019  (KR) .................. 10-2019-0107612

(51) Int. Cl.
  *G06F 3/041*   (2006.01)
  *G06F 3/01*    (2006.01)
  *G09G 3/20*    (2006.01)
  *G06F 3/044*   (2006.01)

(52) U.S. Cl.
  CPC ............ *G06F 3/0412* (2013.01); *G06F 3/016* (2013.01); *G06F 3/044* (2013.01); *G09G 3/2092* (2013.01); *G09G 2310/0264* (2013.01)

(58) Field of Classification Search
  CPC .... G06F 3/04184; G06F 3/0412; G06F 3/044; G06F 3/0443; G06F 3/03547; G06F 3/038; G06F 3/016; G06F 3/04166; G06F 2203/04107; G09G 3/2092; G09G 2310/0264; G09G 3/3233; G09G 2300/0426; G09G 2320/029
  See application file for complete search history.

(56) References Cited

U.S. PATENT DOCUMENTS

2016/0307526 A1*  10/2016  Shibata ................ G09G 3/3614
2020/0135112 A1*  4/2020   Zhang .................. G09G 3/3233

* cited by examiner

*Primary Examiner* — Yaron Cohen
(74) *Attorney, Agent, or Firm* — Fenwick & West LLP

(57) ABSTRACT

The present disclosure relates to a touch display device and a driving method of the same, and more particularly, to a touch display device, in which a touch is sensed by only utilizing electrodes and a line structure for display so that there is no need to provide a touch panel additionally or form additional touch electrodes in a display panel, thereby reducing the size (thickness) of the touch display device and simplifying a manufacturing process of the touch display device, and a driving method of the same.

26 Claims, 25 Drawing Sheets

Mobility Sensing

Vsen Wave

TOUCH DISPLAY DEVICE AND A TOUCH SENSING METHOD OF THE SAME USING A SENSING TRANSISTOR

CROSS-REFERENCE TO RELATED APPLICATIONS

This application claims priority from Republic of Korea Patent Application No. 10-2019-0107612 filed on Aug. 30, 2019, which is incorporated by reference in its entirety.

BACKGROUND

Field of Technology

Exemplary embodiments of the present disclosure relate to a touch display device and a driving method of the same.

Description of the Related Art

Touch display devices may provide a touch-based input function that allows a user to input information or a command intuitively and conveniently in addition to a function of displaying a video or an image.

Such touch display devices should be able to check the presence or absence of a user's touch and accurately sense touch coordinates in order to provide a touch-based input function. To this end, the touch display device includes a touch sensor, a sensing circuit, or the like.

A touch panel including a plurality of touch electrodes, which correspond to touch sensors, may be an external touch panel which is manufactured separately from a display panel and bonded to the display panel or may be an embedded touch panel embedded in a display panel. In the case of the external touch panel, there is a problem in that an additional process of separately manufacturing and assembling two types of panels (a display panel and a touch panel) is required and the size of a touch display device is increased. Further, in the case of the embedded touch panel, there is a problem in that, in manufacturing a display panel, touch electrodes should be additionally formed when electrodes or lines for display are formed, and thus a manufacturing process of the display panel is complicated.

SUMMARY

The present disclosure has been made in an effort to provide a touch display device, in which, without providing a touch panel additionally or forming additional touch electrodes in a display panel, a touch is sensed by only utilizing electrodes and a line structure for display, and a driving method of the same.

The present disclosure has been made in an effort to provide a touch display device, in which a touch is sensed by utilizing pixel electrodes for display as touch electrodes, and a driving method of the same.

The present disclosure has been made in an effort to provide a touch display device, in which, when pixel electrodes for display are used as touch electrodes and touch driving for touch sensing is performed thereon, electrodes or lines in the vicinity of the pixel electrodes serving as the touch electrodes are driven in a similar manner to the touch driving, thereby preventing formation of unnecessary parasitic capacitance and improving touch sensitivity, and a driving method of the same.

The present disclosure has been made in an effort to provide a touch display device, in which the size of a touch electrode is increased by controlling an output of a gate signal, and a driving method of the same.

The present disclosure has been made in an effort to provide a touch display device, in which the size of a touch electrode including one or more pixel electrodes is changed, and a driving method of the same.

According to an aspect of the present disclosure, there is provided a touch display device including a display panel including a plurality of data lines, a plurality of scan lines, and a plurality of subpixels, wherein each of the plurality of subpixels includes a pixel electrode, a driving transistor, and a storage capacitor, and a sensing circuit, which is electrically connected to a first pixel electrode included in a first subpixel among the plurality of subpixels, applies a reference signal for touch driving of which a voltage level is variable to the first pixel electrode, and senses the first pixel electrode, during a touch mode period.

According to another aspect of the present disclosure, there is provided a touch display device including a display panel in which a plurality of data lines, a plurality of scan lines, a plurality of sense lines, and a plurality of reference lines are disposed and which includes a plurality of subpixels, and a sensing circuit configured to output a reference signal of which a voltage level is variable.

Each of the plurality of subpixels may include a light-emitting device including a pixel electrode, a light-emitting layer, and a common electrode, a driving transistor configured to drive the light-emitting device, a scan transistor which is controlled by a scan signal and disposed between and connected to a first node of the driving transistor and the data line, a sense transistor which is controlled by a sense signal and disposed between and connected to a second node of the driving transistor and the reference line, and a storage capacitor disposed between and connected to the first node and the second node of the driving transistor.

During the touch mode period, the sense signal of which a voltage level is variable may be supplied to two or more sense lines among the plurality of sense lines. At least one of a frequency, a phase, and an amplitude of the sense signal of which the voltage level is variable may correspond to that of the reference signal of which the voltage level is variable.

The reference signal of which the voltage level is variable may be supplied to one or more reference lines among the plurality of reference lines and may be applied to the pixel electrode which is electrically connected to the second node of the driving transistor in two or more subpixels among the plurality of subpixels.

According to still another aspect of the present disclosure, there is provided a touch display device including a display panel including a plurality of subpixels, wherein each of the plurality of subpixels includes a light-emitting device including a pixel electrode and a common electrode, a driving transistor configured to drive the light-emitting device, and a storage capacitor including a first plate electrically connected to a first node of the driving transistor and a second plate electrically connected to the pixel electrode, and a sensing circuit configured to detect a signal using at least one first pixel electrode included in at least one first subpixel among the plurality of subpixels during a touch mode period.

During a display mode period, the first plate and the second plate in the storage capacitor in the first subpixel may have a first voltage difference.

During the touch mode period, each of the first plate and the second plate in the storage capacitor in the first subpixel may have a voltage state in which a voltage level is changed.

During the touch mode period, the first plate and the second plate in the storage capacitor in the first subpixel may maintain the first voltage difference.

According to yet another aspect of the present disclosure, there is provided a driving method of a touch display device which includes a common electrode, a plurality of data lines, a plurality of scan lines, and a plurality of subpixels, wherein each of the plurality of subpixels includes a pixel electrode, a driving transistor, and a storage capacitor.

The driving method of the touch display device may include a touch mode operation of applying a reference signal for touch driving of which a voltage level is variable to a first pixel electrode included in a first subpixel among the plurality of subpixels during a touch mode period and sensing the first pixel electrode during the touch mode period.

Advantageous Effects

According to exemplary embodiments of the present disclosure, a touch is sensed by only utilizing electrodes and a line structure for display, and thus there is no need to provide a touch panel additionally or form additional touch electrodes in a display panel. Accordingly, the size (thickness) of a touch display device can be reduced and a manufacturing process of the touch display device can be simplified.

According to the exemplary embodiments of the present disclosure, a touch is sensed by utilizing pixel electrodes for display as touch electrodes, and thus a driving process and a signal detection process for touch sensing can be facilitated.

According to the exemplary embodiments of the present disclosure, when pixel electrodes for display are used as touch electrodes and touch driving for touch sensing is performed thereon, electrodes or lines in the vicinity of the pixel electrodes serving as the touch electrodes are driven in a similar manner to the touch driving, and thus formation of unnecessary parasitic capacitance can be prevented and touch sensitivity can be improved.

According to the exemplary embodiments of the present disclosure, the size of a touch electrode can be increased by controlling an output of a gate signal. Accordingly, the number of channels of a sensing circuit can be reduced.

According to the exemplary embodiments of the present disclosure, the size of a touch electrode including one or more pixel electrodes can be changed. Accordingly, it is possible to provide touch sensing suitable for the situation.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
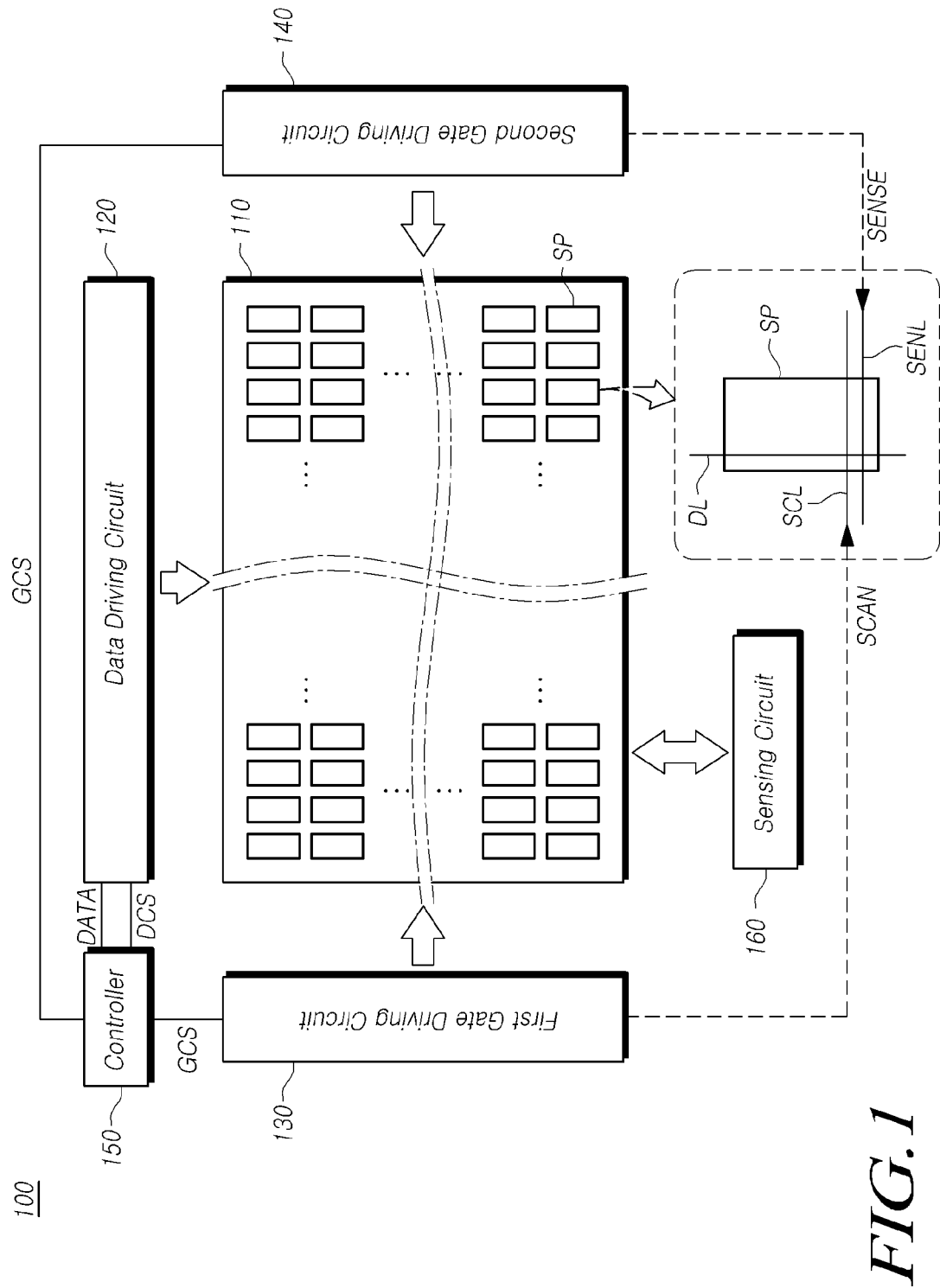
FIG. 1 is a schematic system configuration diagram of a touch display device according to exemplary embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element may be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

FIG. 1 is a schematic system configuration diagram of a touch display device 100 according to exemplary embodiments of the present disclosure.

Referring to FIG. 1, the touch display device 100 according to the exemplary embodiments of the present disclosure may include a display panel 110, a data driving circuit 120, a first gate driving circuit 130, and a second gate driving circuit 140, and may further include a controller 150, and a sensing circuit 160.

The display panel 110 may include a plurality of data lines DL, a plurality of scan lines SCL, a plurality of sense lines SENL, a plurality of reference lines RL, and a plurality of subpixels SP. The display panel 110 may include a display region and a non-display region. In the display region, the plurality of subpixels SP for displaying an image may be disposed. In the non-display region, the driving circuits 120, 130, and 140 may be electrically connected to each other or mounted and a pad portion may be disposed.

The data driving circuit 120 is a circuit for driving the plurality of data lines DL and may supply data voltages to the plurality of data lines DL.

The first gate driving circuit 130 is a circuit for sequentially supplying scan signals SCAN to the plurality of scan lines SCL, which are a type of gate line, or for supplying the scan signals SCAN to the plurality of scan lines SCL at a predetermined timing.

The second gate driving circuit 140 is a circuit for sequentially supplying sense signals SENSE to the plurality of sense lines SENL, which are a type of gate line, or for supplying the sense signals SENSE to the plurality of sense lines SENL at a predetermined timing.

The controller 150 may control the data driving circuit 120, the first gate driving circuit 130, and the second gate driving circuit 140. The controller 150 controls the data driving circuit 120 for data driving and the first gate driving circuit 130 and the second gate driving circuit 140 for gate driving by supplying various types of driving control signals DCS and GCS to the data driving circuit 120, the first gate driving circuit 130, and the second gate driving circuit 140.

The controller 150 starts scanning according to a timing implemented in each frame, converts input image data input from the outside into image data DATA in accordance with a data signal format used by the data driving circuit 120 to output the converted image data DATA, and controls the data driving at a suitable time in accordance with the scanning.

The controller 150 receives various types of timing signals including a vertical synchronization signal VSYNC, a horizontal synchronization signal HSYNC, an input data enable signal DE, a clock signal CLK, and the like together with the input image data from the outside (e.g., a host system).

In addition to converting the input image data input from the outside into the image data DATA in accordance with the data signal format used by the data driving circuit 120 to output the converted image data, the controller 150 receives the timing signals, such as the vertical synchronization signal VSYNC, the horizontal synchronization signal HSYNC, the input data enable signal DE, the clock signal CLK, and the like, and generates various types of control signals DCS and GCS to output the generated control signals DCS and GCS to the data driving circuit 120, the first gate driving circuit 130, and the second gate driving circuit 140 in order to control the data driving circuit 120, the first gate driving circuit 130, and the second gate driving circuit 140.

For example, in order to control the first and second gate driving circuits 130 and 140, the controller 150 outputs various types of gate control signals GCS including a gate start pulse GSP, a gate shift clock GSC, a gate output enable signal GOE, and the like.

Here, the gate start pulse GSP controls an operation start timing of one or more gate driver integrated circuits constituting each of the first and second gate driving circuits 130 and 140. The gate shift clock GSC controls a shift timing of a scan signal (a gate pulse), which is a clock signal commonly input to the one or more gate driver integrated circuits. The gate output enable signal GOE designates timing information of the one or more gate driver integrated circuits.

Further, in order to control the data driving circuit 120, the controller 150 outputs various types of data control signals DCS including a source start pulse SSP, a source sampling clock SSC, a source output enable signal SOE, and the like.

Here, the source start pulse SSP controls a data sampling start timing of one or more source driver integrated circuits constituting the data driving circuit 120. The source sampling clock SSC is a clock signal that controls a sampling timing of data in each of the source driver integrated circuits. The source output enable signal SOE controls an output timing of the data driving circuit 120.

The controller 150 may be implemented as a separate component from the data driving circuit 120 or may be integrated with the data driving circuit 120 and implemented as an integrated circuit.

The data driving circuit 120 receives the image data DATA from the controller 150 and supplies data voltages to the plurality of data lines DL to drive the plurality of data lines DL. Here, the data driving circuit 120 is also referred to as a source driving circuit.

The data driving circuit 120 may include at least one source driver integrated circuit SDIC.

Each source driver integrated circuit SDIC may include a shift register, a latch circuit, a digital-to-analog converter DAC, an output buffer, and the like.

In some cases, each source driver integrated circuit SDIC may further include an analog-to-digital converter ADC. Each source driver integrated circuit SDIC may include the sensing circuit 160.

Each source driver integrated circuit SDIC may be connected to a bonding pad of the display panel 110 with a tape automated bonding (TAB) method or a chip on glass (COG) method or may be directly disposed in the display panel 110. In some cases, each source driver integrated circuit SDIC may be integrated with the display panel 110 and disposed. Further, each source driver integrated circuit SDIC may be implemented with a chip on film (COF) method. In this case, each source driver integrated circuit SDIC may be mounted on a film connected to the display panel 110 and may be electrically connected to the display panel 110 through lines on the film.

The first gate driving circuit 130 sequentially supplies the scan signals SCAN to the plurality of scan lines SCL or supplies the scan signals SCAN at a predetermined timing to the plurality of scan lines SCL to sequentially drive the plurality of scan lines SCL or drive the plurality of scan lines SCL at the predetermined timing. The first gate driving circuit 130 may output a scan signal SCAN having a turn-on level or a turn-off level under the control of the controller 150.

The second gate driving circuit 140 sequentially supplies the sense signals SENSE to the plurality of sense lines SENL or supplies the sense signals SENSE at a predetermined timing to the plurality of sense lines SENL to sequentially drive the plurality of sense lines SENL or drive the plurality of sense lines SENL at the predetermined timing. The second gate driving circuit 140 may output a sense signal SENSE having a turn-on level or a turn-off level under the control of the controller 150.

The plurality of scan lines SCL and the plurality of sense lines SENL correspond to gate lines. Each of the scan signal SCAN and the sense signal SENSE corresponds to a gate signal applied to a gate node of a corresponding transistor.

Each of the first and second gate driving circuits 130 and 140 may include at least one gate driving integrated circuit GDIC.

Each gate driving integrated circuit GDIC may include a shift register, a level shifter, and the like.

Each gate driver integrated circuit GDIC may be connected to the bonding pad of the display panel 110 with a TAB method or a COG method or may be implemented as a gate-in-panel (GIP) type and directly disposed in the display panel 110. In some cases, each gate driver integrated circuit GDIC may be integrated with the display panel 110 and disposed. Further, each gate driver integrated circuit GDIC may be implemented with a COF method in which the gate driver integrated circuit GDIC is mounted on a film connected to the display panel 110.

When a specific scan line SCL is enabled by the first gate driving circuit 130, the data driving circuit 120 converts the image data DATA received from the controller 150 into an analog-type data voltage to supply the converted analog-type data voltage to the plurality of data lines DL.

The data driving circuit 120 may be located only on one side (e.g., an upper side or a lower side) of the display panel 110. In some cases, the data driving circuit 120 may be located on both sides (e.g., the upper side and the lower side) of the display panel 110 according to a driving method, a panel design method, or the like.

Each of the first and second gate driving circuits 130 and 140 may be located only on one side (e.g., a left side or a right side) of the display panel 110. In some cases, each of the first and second gate driving circuits 130 and 140 may be located on both sides (e.g., the left side and the right side) of the display panel 110 according to a driving method, a panel design method, or the like.

The controller 150 may be a timing controller used in a conventional display technique or a control device that performs other control functions in addition to a function of a timing controller, may be a control device different from a timing controller, or may be a circuit in a control device. The controller 150 may be implemented as various circuits or electronic components, such as integrated circuits (IC), field programmable gate arrays (FPGA), application specific integrated circuits (ASIC), processors, or the like.

The controller 150 may be mounted on a printed circuit board, a flexible printed circuit, or the like, and may be electrically connected to the data driving circuit 120, the first gate driving circuit 130, and the second gate driving circuit 140 through the printed circuit board, the flexible printed circuit, or the like.

The controller 150 may transmit or receive signals to or from the data driving circuit 120 according to one or more predetermined interfaces. Here, for example, the interfaces may include a low voltage D differential signaling (LVDS) interface, an embedded panel interface (EPI), a Serial Peripheral Interface (SPI), and the like.

The controller 150 may transmit or receive signals to or from the data driving circuit 120, the first gate driving circuit 130, and the second gate driving circuit 140 according to one or more predetermined interfaces. Here, for example, the interfaces may include an LVDS interface, an EPI, an SPI, and the like. The controller 150 may include storage units such as one or more registers or the like.

The touch display device 100 according to the exemplary embodiments of the present disclosure may be any type of display including a light-emitting element (a light-emitting device) in the subpixel SP. For example, the touch display device 100 according to the exemplary embodiments of the present disclosure may be an organic light-emitting diode (OLED) display including OLEDs as a light-emitting element (a light-emitting device) in the subpixel SP or may be a light-emitting diode (LED) display including LEDs as a light-emitting element in the subpixel SP.

Referring to FIG. 1, the touch display device 100 according to the exemplary embodiments of the present disclosure may provide a function of sensing a touch as well as a function of displaying an image. To this end, the touch display device 100 according to the exemplary embodiments of the present disclosure further includes the sensing circuit 160.

In order to sense a touch, the touch display device 100 according to the exemplary embodiments of the present disclosure does not include additional dedicated touch sensors (touch electrodes) and additional signal lines and uses an electrode structure and a signal line structure for display. A description thereof will be described in more detail with reference to FIG. 4.

Figure 2:
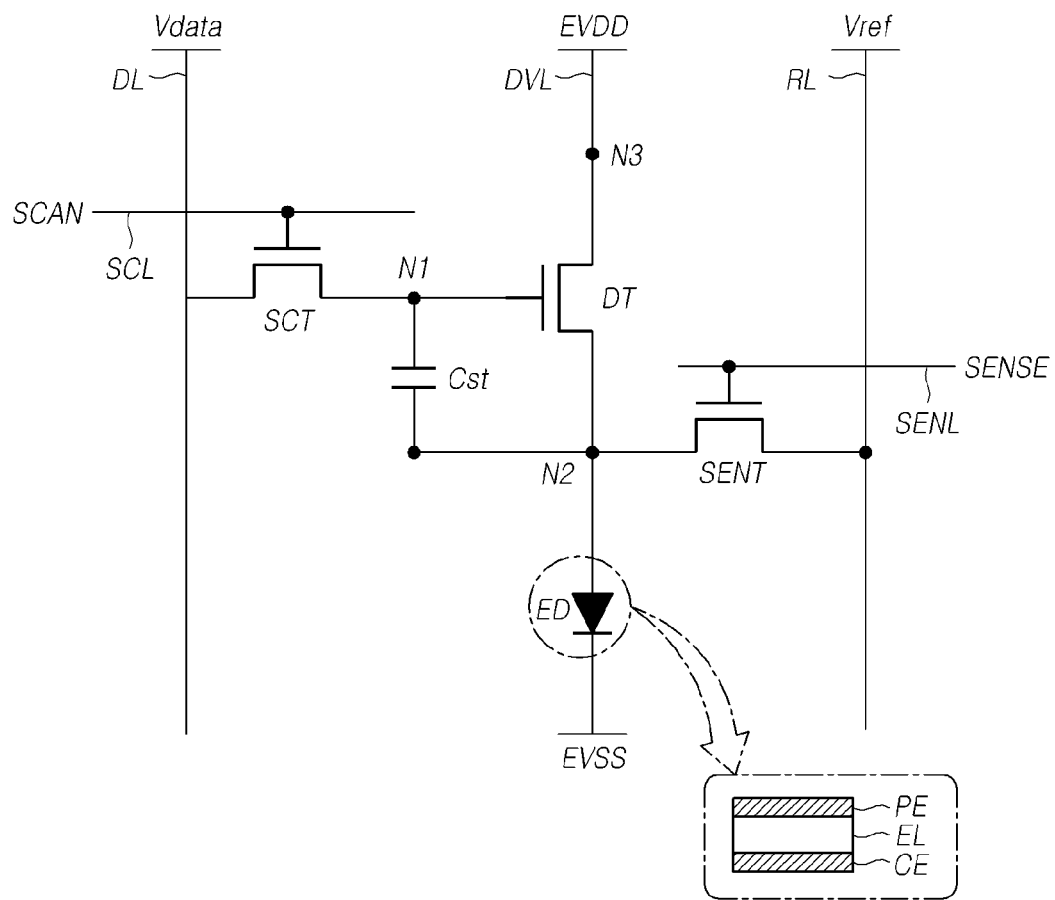
FIG. 2 is an equivalent circuit of a subpixel of a touch display device according to exemplary embodiments of the present disclosure.

FIG. 2 is a diagram illustrating an equivalent circuit of the subpixel SP disposed in the display panel 110 of the touch display device 100 according to the exemplary embodiments of the present disclosure.

Referring to FIG. 2, each of the plurality of subpixels SP may include, for example, a light-emitting device ED, three transistors DT, SCT, and SENT, and one storage capacitor Cst. Such a subpixel structure is referred to as a three-transistor one-capacitor (3T1C) structure.

The three transistors DT, SCT, and SENT may include a driving transistor DT, a scan transistor SCT, and a sense transistor SENT.

The light-emitting device ED may include a pixel electrode PE disposed in each subpixel SP, a common electrode CE commonly disposed in the plurality of subpixels SP, and the like. In the light-emitting device ED, the pixel electrode PE may be an anode electrode or a cathode electrode, and the common electrode CE may be a cathode electrode or an anode electrode.

In the example of the light-emitting device ED of FIG. 2, the pixel electrode PE is an anode electrode and the common electrode CE is a cathode electrode. A base voltage EVSS corresponding to a common voltage may be applied to the common electrode CE.

For example, the light-emitting device ED may be implemented as an OLED including a pixel electrode PE, a light-emitting layer EL, and a common electrode CE or may be implemented as an LED.

The driving transistor DT is a transistor for driving the light-emitting device ED and may include a first node N1, a second node N2, and a third node N3.

The first node N1 of the driving transistor DT may be a gate node and may be electrically connected to a source node or a drain node of the scan transistor SCT.

The second node N2 of the driving transistor DT may be a source node or a drain node, may be electrically connected to a source node or a drain node of the sense transistor SENT, and may also be electrically connected to the pixel electrode PE of the light-emitting device ED.

The third node N3 of the driving transistor DT may be electrically connected to a driving line DVL that supplies a driving voltage EVDD.

The scan transistor SCT may be turned on or off in response to the scan signal SCAN, which is supplied from the scan line SCL, to control the connection of the data line DL and the first node N1 of the driving transistor DT.

The scan transistor SCT may be turned on by the scan signal SCAN having a turn-on level voltage to transmit a data voltage Vdata, which is supplied from the data line DL, to the first node N1 of the driving transistor DT.

The sense transistor SENT may be turned on or off in response to the sense signal SENSE, which is supplied from the sense line SENL, to control the connection of the reference line RL and the second node N2 of the driving transistor DT.

The sense transistor SENT may be turned on by the sense signal SENSE having a turn-on level voltage to transmit a reference signal Vref, which is supplied from the reference line RL, to the second node N2 of the driving transistor DT.

Further, the sense transistor SENT may be turned on by the sense signal SENSE having a turn-on level voltage to transmit a voltage of the second node N2 of the driving transistor DT to the reference line RL.

A function in which the sense transistor SENT transmits the voltage of the second node N2 of the driving transistor DT to the reference line RL may be used in driving to sense a characteristic value (e.g., a threshold voltage or mobility) of the driving transistor DT. In this case, the voltage transmitted to the reference line RL may be a voltage for calculating the characteristic value of the driving transistor DT.

The function in which the sense transistor SENT transfers the voltage of the second node N2 of the driving transistor DT to the reference line RL may be used in driving to sense a characteristic value (e.g., a threshold voltage) of the light-emitting device ED. In this case, the voltage transmitted to the reference line RL may be a voltage for calculating the characteristic value of the light-emitting device ED.

Each of the driving transistor DT, the scan transistor SCT, and the sense transistor SENT may be an N-type transistor or a P-type transistor.

In the following, for convenience of description, it is assumed that each of the driving transistor DT, the scan transistor SCT, and the sense transistor SENT is an N-transistor. Accordingly, a turn-on level voltage of each of the scan signal SCAN and the sense signal SENSE is a high-level gate voltage VGH, and a turn-off level voltage of each of the scan signal SCAN and the sense signal SENSE is a low-level gate voltage VGL.

When each of the scan transistor SCT and the sense transistor SENT is a P-type transistor, the turn-on level voltage of each of the scan signal SCAN and the sense signal SENSE may be a low-level gate voltage VGL, and the turn-off level voltage of each of the scan signal SCAN and the sense signal SENSE may be a high-level gate voltage VGH.

The storage capacitor Cst may be disposed between and connected to the first node N1 and the second node N2 of the driving transistor DT. That is, the storage capacitor Cst may include a first plate which is electrically connected to the first node N1 of the driving transistor DT, and a second plate which is electrically connected to the second node N2 of the driving transistor DT and the pixel electrode PE.

The storage capacitor Cst is charged by an amount of charges corresponding to a voltage difference between the two nodes N1 and N2 and serves to maintain the voltage difference between the two nodes N1 and N2 during a predetermined frame time. Accordingly, during the predetermined frame time, light may be emitted from a corresponding subpixel SP.

The storage capacitor Cst may be an external capacitor intentionally designed outside the driving transistor DT, rather than a parasitic capacitor (e.g., Cgs or Cgd), which is an internal capacitor present between the gate node and the source node (or the drain node) of the driving transistor DT.

Figure 3:
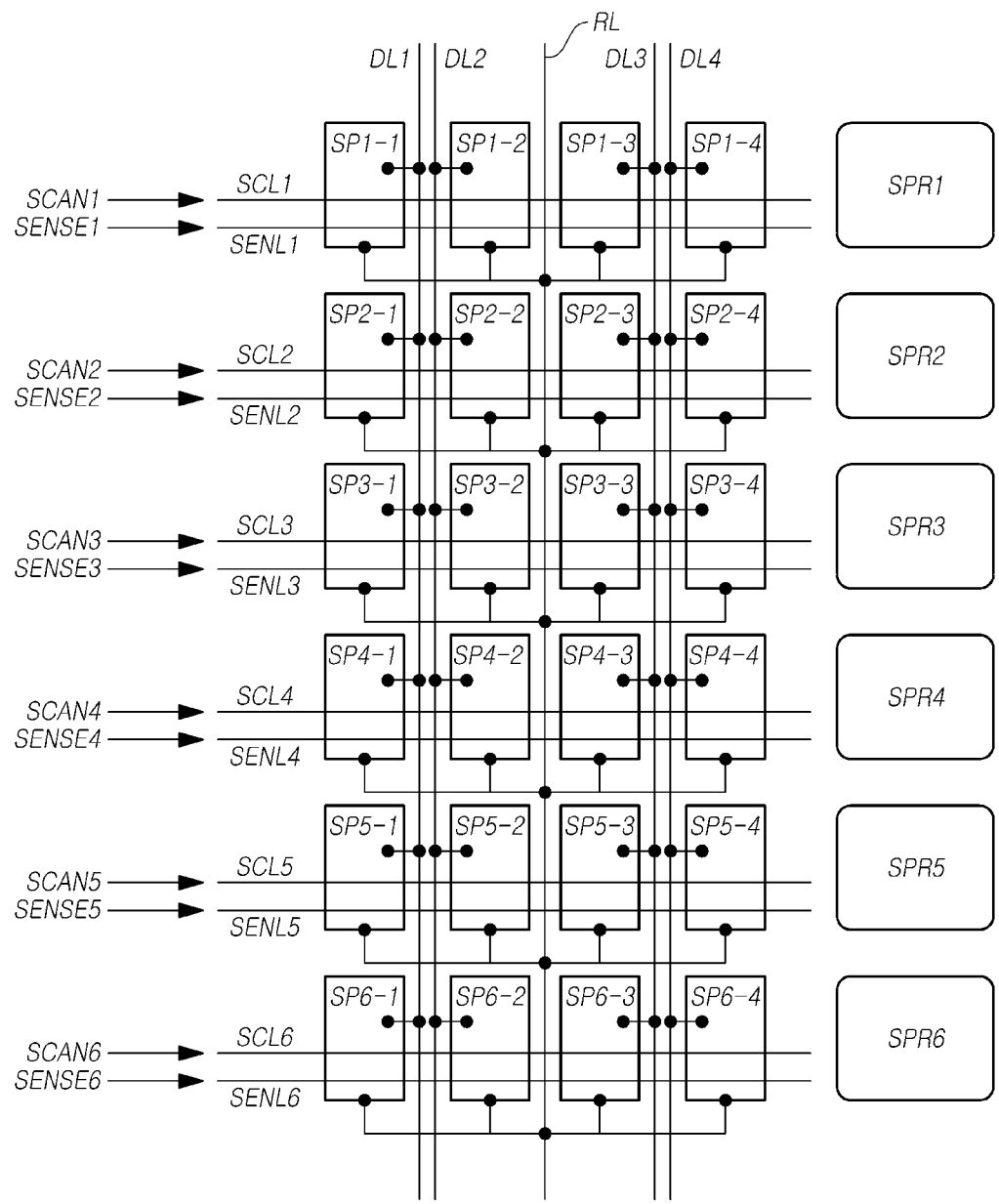
FIG. 3 is an exemplary diagram of an arrangement of subpixels and signal lines in a touch display device according to exemplary embodiments of the present disclosure.

FIG. 3 is an exemplary diagram of an arrangement of subpixels SP1-1 to SP1-4, SP2-1 to SP2-4, SP3-1 to SP3-4, SP4-1 to SP4-4, SP5-1 to SP5-4, and SP6-1 to SP6-4 and signal lines SCL1 to SCL6, sense lines SENL1 to SENL6, data lines DL1 to DL4, and reference line RL in the touch display device 100 according to the exemplary embodiments of the present disclosure.

Referring to FIG. 3, the plurality of subpixels SP disposed in the display panel 110 may include 24 subpixels SP1-1 to SP1-4, SP2-1 to SP2-4, SP3-1 to SP3-4, SP4-1 to SP4-4, SP5-1 to SP5-4, and SP6-1 to SP6-4. FIG. 3 illustrates an example in which the 24 subpixels SP1-1 to SP1-4, SP2-1 to SP2-4, SP3-1 to SP3-4, SP4-1 to SP4-4, SP5-1 to SP5-4, and SP6-1 to SP6-4 are arranged in six rows and four columns.

The 24 subpixels SP1-1 to SP1-4, SP2-1 to SP2-4, SP3-1 to SP3-4, SP4-1 to SP4-4, SP5-1 to SP5-4, and SP6-1 to SP6-4 are arranged in six subpixel rows SPR1 TO SPR6. The subpixel row is also referred to as a subpixel line.

Referring to FIG. 3, in the six subpixel rows SPR1 TO SPR6, six scan lines SCL1 to SCL6 may be disposed to correspond to the six subpixel rows SPR1 TO SPR6. The six scan lines SCL1 to SCL6 supply scan signals SCAN1 to SCAN6 to the six subpixel rows SPR1 TO SPR6, respectively.

Referring to FIG. 3, in the six subpixel rows SPR1 TO SPR6, six sense lines SENL1 to SENL6 may be disposed to correspond to the six subpixel rows SPR1 TO SPR6. The six sense lines SENL1 to SENL6 supply sense signals SENSE1 to SENSE6 to the six subpixel rows SPR1 TO SPR6, respectively.

Referring to FIG. 3, four data lines DL1 to DL4 may be disposed to correspond to four subpixel columns.

One reference line RL may be disposed in each subpixel column, or one reference line RL may be disposed in every two subpixel columns.

According to the example of FIG. 3, one reference line RL may be disposed in every four subpixel columns. In this case, the reference line RL may supply a reference signal Vref to the subpixels arranged in the four subpixel columns. That is, the four subpixel columns may share the reference line RL with each other.

For example, when a first sense signal SENSE1 having a turn-on level is supplied to a first sense line SENL1 corresponding to a first subpixel row SPR1, sense transistors SENT included in the respective subpixels SP1-1 to SP1-4 included in the first subpixel row SPR1 are simultaneously turned on. In this case, the reference signal Vref supplied to the reference line RL may be applied to pixel electrodes PE included in the respective subpixels SP1-1 to SP1-4 included in the first subpixel row SPR1 through the sense transistors SENT included in the respective subpixels SP1-1 to SP1-4 included in the first subpixel row SPR1.

Referring to FIG. 3, it is assumed that in one subpixel row, four subpixels SP, which share one reference line RL with each other, constitute one pixel. For example, the four subpixels SP constituting one pixel may include a red subpixel emitting red light, a white subpixel emitting white light, a green subpixel emitting green light, and a blue subpixel emitting blue light.

For example, in the first subpixel row SPR1, the four subpixels SP1-1 to SP1-4, which shares one reference line RL with each other, constitute one pixel.

Figure 4:
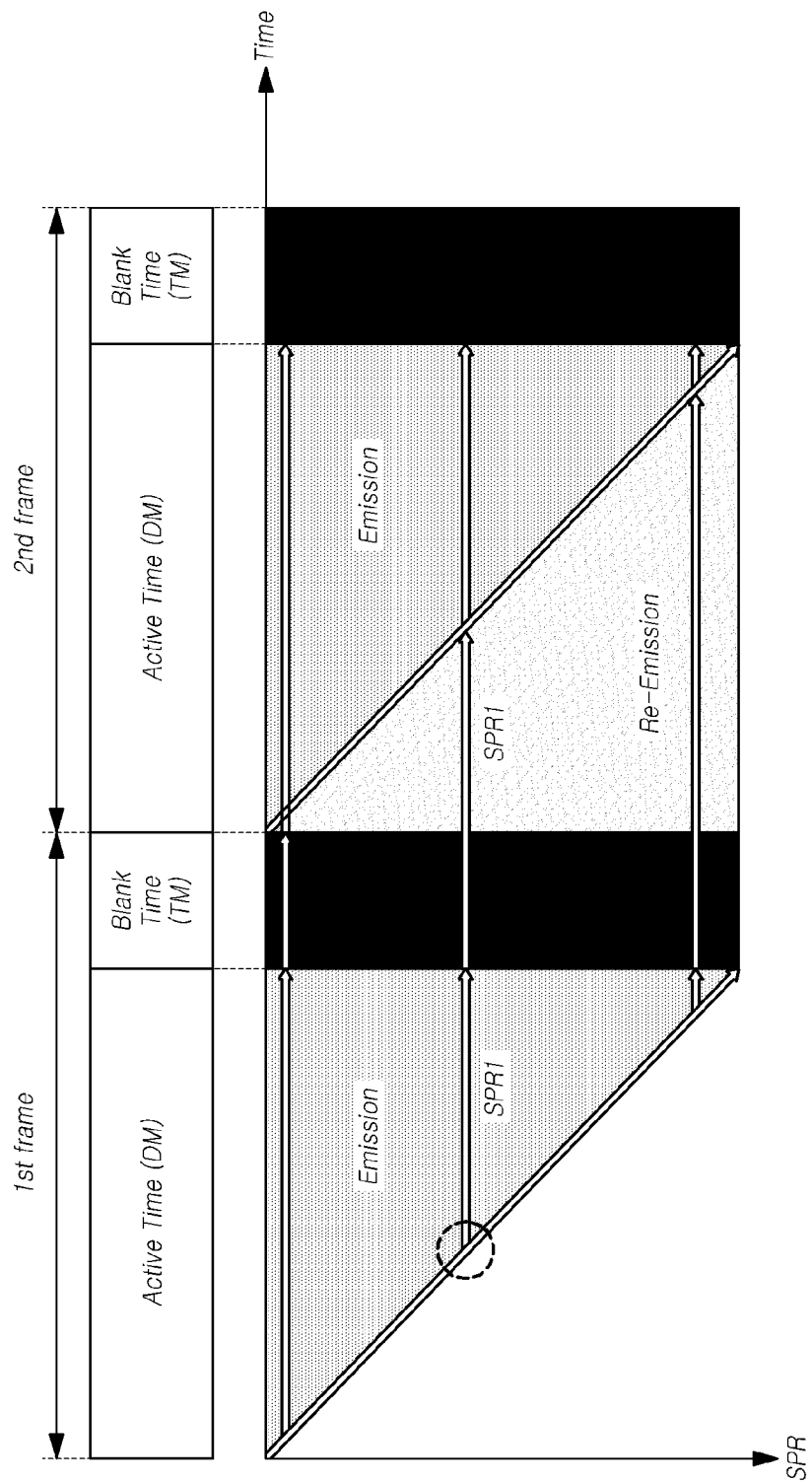
FIG. 4 is a driving timing diagram of a touch display device according to exemplary embodiments of the present disclosure.

FIG. 4 is a driving timing diagram of the touch display device 100 according to the exemplary embodiments of the present disclosure.

Referring to FIG. 4, one frame time of the touch display device 100 according to the exemplary embodiments of the present disclosure may include an active time (DM) and a blank time (TM). The active time is a time for which actual display driving for displaying an image is performed and is a time for updating the image.

Referring to FIG. 4, the touch display device 100 may operate in a display mode during the active time to perform display driving and may operate in a touch mode during the blank time to perform touch sensing. In other words, the touch display device 100 may time-divide an operation time into a display mode period DM and a touch mode period TM, update the image by performing display driving during the display mode period DM corresponding to the active time, and sense a touch by performing touch driving during the touch mode period TM included in the blank time.

In the following, the display mode period DM and the touch mode period TM are described as being periods temporally separated. However, in some cases, the display mode period DM and the touch mode period TM may coincide with each other or may partially overlap each other. That is, the display driving and the touch driving may be simultaneously performed or may be performed at an overlapping time.

Referring to FIG. 4, in the case of the touch display device 100 according to the exemplary embodiments of the present disclosure, a plurality of subpixel rows SPR (which are also referred to as subpixel lines) on the display panel 110 are sequentially scanned.

Referring to FIG. 4, in the case of the touch display device 100 according to the exemplary embodiments of the present disclosure, each of the plurality of subpixel rows SPR may be scanned at a predetermined timing, light may be emitted during the active time corresponding to the display mode period DM, the light emission may be stopped during the blank time, and then the light may be re-emitted until a next scanning timing when a next active time is reached.

Referring to FIG. 4, during the touch mode period TM of the blank time, the touch display device 100 may operate in a touch mode to sense a touch. During the touch mode period TM, the light emission of the subpixel SP may be stopped.

Figure 5:
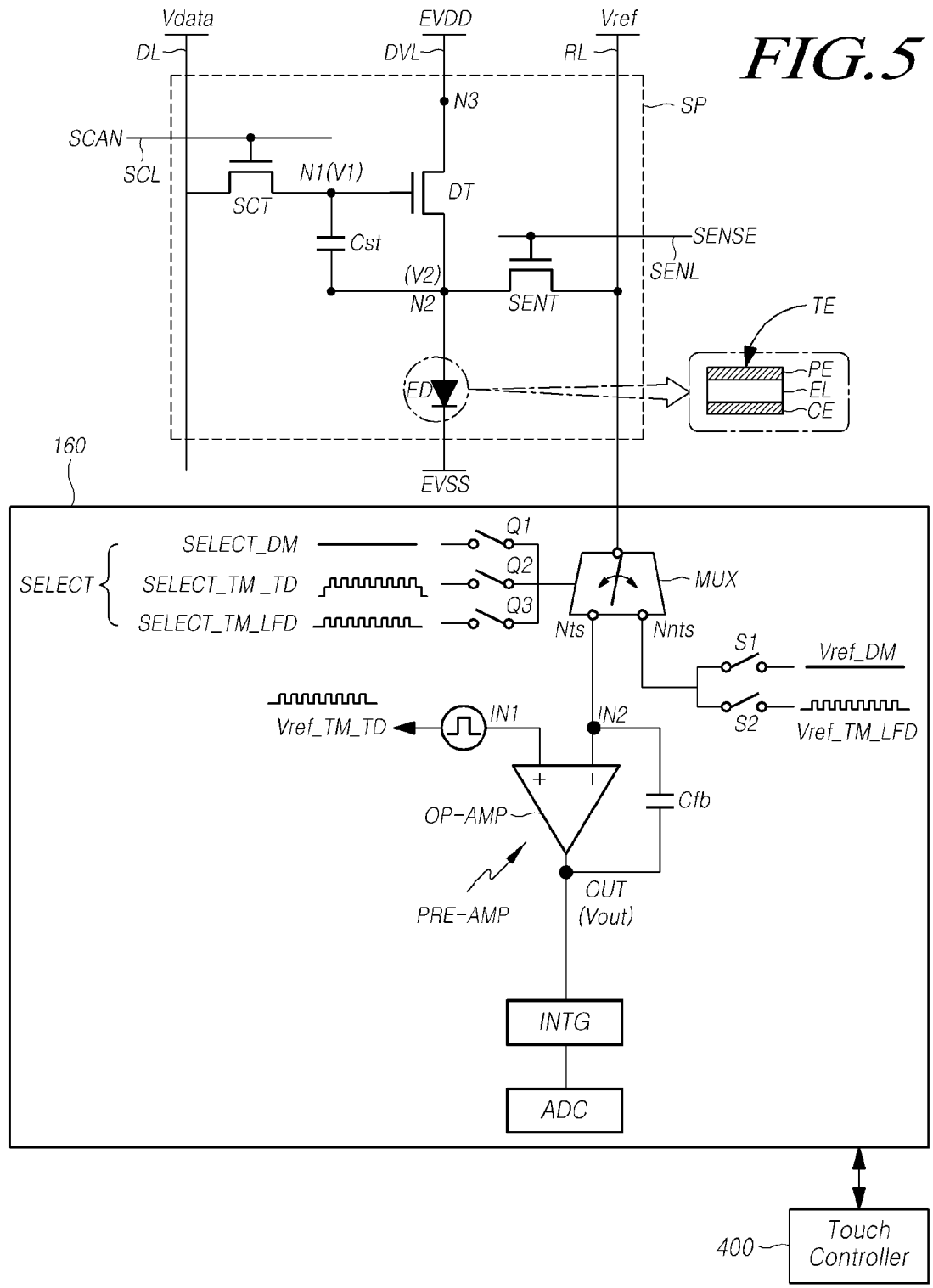
FIG. 5 is a diagram illustrating a sensing circuit of a touch display device according to exemplary embodiments of the present disclosure.

FIG. 5 is a diagram illustrating a sensing circuit 160 of a touch display device 100 according to exemplary embodiments of the present disclosure.

Referring to FIG. 5, the touch display device 100 according to the exemplary embodiments of the present disclosure includes a display panel 110 including a plurality of data lines DL, a plurality of scan lines SCL, and a plurality of subpixels SP. In the display panel 110, each of the plurality of subpixels SP may include a pixel electrode PE, a driving transistor DT, and a storage capacitor Cst.

In the touch display device 100 according to the exemplary embodiments of the present disclosure, a pixel electrode PE for display included in each of subpixels SP is used as a touch electrode.

The sensing circuit 160 included in the touch display device 100 according to the exemplary embodiments of the present disclosure is electrically connected to a pixel electrode PE included in at least one subpixel SP among the plurality of subpixels SP during a touch mode period TM. The pixel electrode PE may be a second node N2 of the driving transistor DT, or may be an electrode which is electrically connected to the second node N2 of the driving transistor DT.

During the touch mode period TM, the sensing circuit 160 applies a reference signal Vref_TM_TD for touch driving of which a voltage level is variable to the pixel electrode PE which is electrically connected thereto.

During the touch mode period TM, the sensing circuit 160 senses the pixel electrode PE to which the reference signal Vref_TM_TD for touch driving is applied. That the sensing circuit 160 senses the pixel electrode PE may signify that the sensing circuit 160 senses a capacitance between the pixel electrode PE and a touch object (e.g., a finger, a pen, etc.) or a change of the capacitance or that the sensing circuit 160 detects a signal from the pixel electrode PE.

In the following, the subpixel SP, which is electrically connected to the sensing circuit 160 and includes the pixel electrode PE to which the reference signal Vref_TM_TD for touch driving is applied during the touch mode period TM, is also referred to as a sensing target subpixel SP, for convenience of description.

During the touch mode period TM, the driving transistor DT in the sensing target subpixel SP may be in a turned-off state. Accordingly, during the touch mode period TM, no current may be supplied to a light-emitting device ED in the sensing target subpixel SP through the driving transistor DT, and thus the light-emitting device ED in the sensing target subpixel SP may be in a non-light-emitting state.

During the touch mode period TM, a voltage state and a voltage value of each of two nodes N1 and N2 of the storage capacitor Cst in the sensing target subpixel SP may be changed in comparison to those before the touch mode period TM.

However, a voltage difference between the two nodes N1 and N2 of the storage capacitor Cst in the sensing target subpixel SP during the touch mode period TM may correspond to a voltage difference between the two nodes N1 and N2 of the storage capacitor Cst in the sensing target subpixel SP during a period before or after the touch mode period TM. Here, the period before or after the touch mode period TM may correspond to a display mode period DM.

That is, a voltage difference between a first node N1 and a second node N2 of the driving transistor DT during the touch mode period TM may correspond to a voltage difference between the first node N1 and the second node N2 of the driving transistor DT during the display mode period DM.

The voltage difference between the two nodes N1 and N2 of the storage capacitor Cst in the sensing target subpixel SP during the touch mode period TM corresponds to the voltage difference between the two nodes N1 and N2 of the storage capacitor Cst in the sensing target subpixel SP during the period before or after the touch mode period TM, and thus even when the touch mode period TM is present between the display mode period DM and another display mode period DM, the display cannot be affected by touch sensing during the touch mode period TM and degradation of display quality due to the touch sensing can be prevented.

As described above, each of the plurality of subpixels SP may include the pixel electrode PE, the driving transistor DT, and the storage capacitor Cst and may further include a scan transistor SCT and a sense transistor SENT.

The driving transistor DT includes a first node N1, a second node N2, and a third node N3. The second node N2 of the driving transistor DT may be electrically connected to the pixel electrode PE, and the third node N3 of the driving transistor DT may be electrically connected to a driving line DVL to which a driving voltage EVDD is applied.

A gate node of the scan transistor SCT may be electrically connected to a corresponding scan line SCL among the plurality of scan lines SCL, a drain node or a source node of the scan transistor SCT may be electrically connected to a corresponding data line DL among the plurality of data lines DL, and the source node or the drain node of the scan transistor SCT may be electrically connected to the first node N1 of the driving transistor DT.

A gate node of the sense transistor SENT may be electrically connected to a corresponding sense line SENL among the plurality of sense lines SENL, a drain node or a source node of the sense transistor SENT may be electrically connected to a corresponding reference line RL among the plurality of reference lines RL, and the source node or the drain node of the sense transistor SENT may be electrically connected to the second node N2 of the driving transistor DT.

The storage capacitor Cst may be disposed between and electrically connected to the first node N1 and the second node N2 of the driving transistor DT.

The driving voltage EVDD applied to the driving line DVL during the display mode period DM different from the touch mode period TM is a driving voltage EVDD_DM for a display mode having a constant voltage level.

The driving voltage EVDD applied to the driving line DVL during the touch mode period TM is a driving voltage EVDD_TM for a touch mode of which a voltage level is variable. Here, at least one of a frequency, a phase, and an amplitude of the driving voltage EVDD_TM for a touch mode may correspond to that of the reference signal Vref_TM_TD for touch driving. Accordingly, during the touch mode period TM, unnecessary parasitic capacitance formed between the pixel electrode PE serving as the touch electrode and the driving line DVL can be reduced, thereby improving touch sensitivity.

The voltage level of the driving voltage EVDD_TM for a touch mode may be variable within a range in which the driving transistor DT is turned off. For example, a high-level voltage of the driving voltage EVDD_TM for a touch mode may be lower than that of the driving voltage EVDD_DM for a display mode.

During the touch mode period TM, at least one of a frequency, a phase, and an amplitude of a base voltage EVSS applied to a common electrode CE may correspond to that of the reference signal Vref_TM_TD for touch driving, and a voltage level of the base voltage EVSS applied to the common electrode CE may be changed. Accordingly, during the touch mode period TM, unnecessary parasitic capacitance formed between the common electrode CE and the driving line DVL can be reduced, thereby improving touch sensitivity.

The sensing circuit 160 described above will be described in more detail.

Referring to FIG. 5, the sensing circuit 160 may include a pre-amplifier PRE-AMP, an integrator INTG, and an analog-to-digital converter ADC. Further, the sensing circuit 160 may further include a multiplexer MUX and additional switches S1, S2, Q1, Q2, and Q3.

The multiplexer MUX may connect one node among a touch sensing node Nts and a non-touch sensing node Nnts to a corresponding reference line RL.

The touch sensing node Nts of the multiplexer MUX is a node which is electrically connected to a corresponding reference line RL during the touch mode period TM. Here, the reference line RL, which is electrically connected to the touch sensing node Nts during the touch mode period TM, is a reference line which is electrically connected to the pixel electrode PE in the subpixel SP that is a touch sensing target.

Two types of reference switches S1 and S2 may be connected to the non-touch sensing node Nnts of the multiplexer MUX.

During the display mode period DM, the non-touch sensing node Nnts of the multiplexer MUX may be electrically connected to all reference lines RL, which are connected to the multiplexer MUX during the touch mode period TM, or a specific reference line RL.

In this case, during the display mode period DM, a reference signal Vref_DM for a display mode, which is a direct current (DC) voltage type and has a constant voltage level, may be applied to the non-touch sensing node Nnts of the multiplexer MUX through a first reference switch S1 that is turned on.

Further, the non-touch sensing node Nnts of the multiplexer MUX is a node which is electrically connected to a corresponding reference line RL during the touch mode period TM. Here, the reference line RL, which is electrically connected to the non-touch sensing node Nnts during the touch mode period TM, is a reference line which is not electrically connected to the pixel electrode PE in the subpixel SP that is a touch sensing target.

In this case, during the touch mode period TM, a reference signal Vref_TM_LFD for load-free driving (LFD) which is an alternating current (AC) voltage type and of which a voltage level is variable may be applied to the non-touch sensing node Nnts of the multiplexer MUX through a second reference switch S2 that is turned on. Here, at least one of a frequency, a phase, and an amplitude of the reference signal Vref_TM_LFD for LFD may correspond to that of the reference signal Vref_TM_TD for touch driving.

In one embodiment, the LFD refers to driving for reducing parasitic capacitance from being formed between the pixel electrode PE on which touch driving is performed and various types of electrodes or signal lines located in the vicinity of the pixel electrode PE. To this end, the touch display device 100 applies a signal of which at least one of a frequency, a phase, and an amplitude corresponds to that of the reference signal Vref_TM_TD for touch driving applied to the pixel electrode PE on which touch driving is performed to various types of electrodes or signal lines located in the vicinity of the pixel electrode PE.

The pre-amplifier PRE-AMP is for checking an electrical state of a corresponding pixel electrode PE and may include an operation amplifier OP-AMP and a feedback capacitor Cfb.

The operation amplifier OP-AMP may include a first input node IN1 to which the reference signal Vref_TM_TD for touch driving is input, a second input node IN2 which is electrically connected to the touch sensing node Nts of the multiplexer MUX, and an output node OUT through which an output signal Vout is output.

The feedback capacitor Cfb may be disposed between and electrically connected to the second input node IN2 and the output node OUT of the operation amplifier OP-AMP.

As described above, the reference signal Vref applied to one reference line RL may be one reference signal among three types of reference signals Vref_DM, Vref_TM_TD, and Vref_TM_LFD, according to a type of operation mode DM or TM, whether the reference line RL and the pixel electrode PE are connected, or whether the pixel electrode PE in the subpixel SP connected to the reference line RL is sensed.

The integrator INTG integrates the output signal Vout output from the pre-amplifier PRE-AMP and outputs an integral value.

The analog-to-digital converter ADC may convert an analog value corresponding to the integral value output from the integrator INTG into a digital value corresponding to a sensing value and output the converted digital value.

Meanwhile, the touch display device 100 may further include a touch controller 400 that detects a touch position and/or touch coordinates on the basis of the sensing value output from the analog-to-digital converter ADC. The touch controller 400 may be implemented as a micro control unit (MCU).

The sensing circuit 160 and the touch controller 400 may be implemented as separate components or may be included in one component.

Meanwhile, the multiplexer MUX may electrically connect one node among the touch sensing node Nts and the non-touch sensing node Nnts to the corresponding reference line RL in response to a selection signal SELECT that is input.

In response to the input selection signal SELECT, the multiplexer MUX may control whether the reference line RL connected to the corresponding subpixel SP and the pre-amplifier PRE-AMP are connected or may select a type of the reference signal Vref which will be supplied to the reference line RL connected to the corresponding subpixel SP.

The selection signal SELECT may be one type of signal among a selection signal SELECT_DM for a display mode having a constant voltage level, a selection signal SELECT_TM_TD for touch driving of which a voltage level is variable within a first voltage range, and a selection signal SELECT_TM_LFD for LFD of which a voltage level is variable within a second voltage range different from the first voltage range.

Here, the first voltage range may be higher than the second voltage range. That is, a low-level voltage of the selection signal SELECT_TM_TD for touch driving of which the voltage level is variable within the first voltage range may be higher than a high-level voltage of the selection signal SELECT_TM_LFD for LFD of which the voltage level is variable within the second voltage range.

At least one of a frequency, a phase, and an amplitude of each of the selection signal SELECT_TM_TD for touch driving and the selection signal SELECT_TM_LFD for LFD may correspond to that of the reference signal Vref_TM_TD for touch driving.

Three types of selection switches Q1, Q2, and Q3 may be connected to the multiplexer MUX.

The selection signal SELECT_DM for a display mode may be applied to the multiplexer MUX through a first selection switch Q1 that is turned on during the display mode period DM.

The selection signal SELECT_TM_TD for touch driving may be applied to the multiplexer MUX through a second selection switch Q2 that is turned on during the touch mode period TM.

The selection signal SELECT_TM_LFD for LFD may be applied to the multiplexer MUX through a third selection switch Q3 that is turned on during the touch mode period TM.

During the touch mode period TM, one switch among the second selection switch Q2 and the third selection switch Q3 may be selectively turned on according to a role of a corresponding reference line RL (a sensing path or a non-sensing path (in this case, an LFD target)).

Referring to FIG. 5, a voltage of the pixel electrode PE serving as the touch electrode corresponds to a voltage V2 of the second node N2 of the driving transistor DT.

During the touch mode period TM, a voltage V1 of the first node N1 of the driving transistor DT may be changed due to the voltage V2 of the second node N2 of the driving transistor DT.

Figure 6:
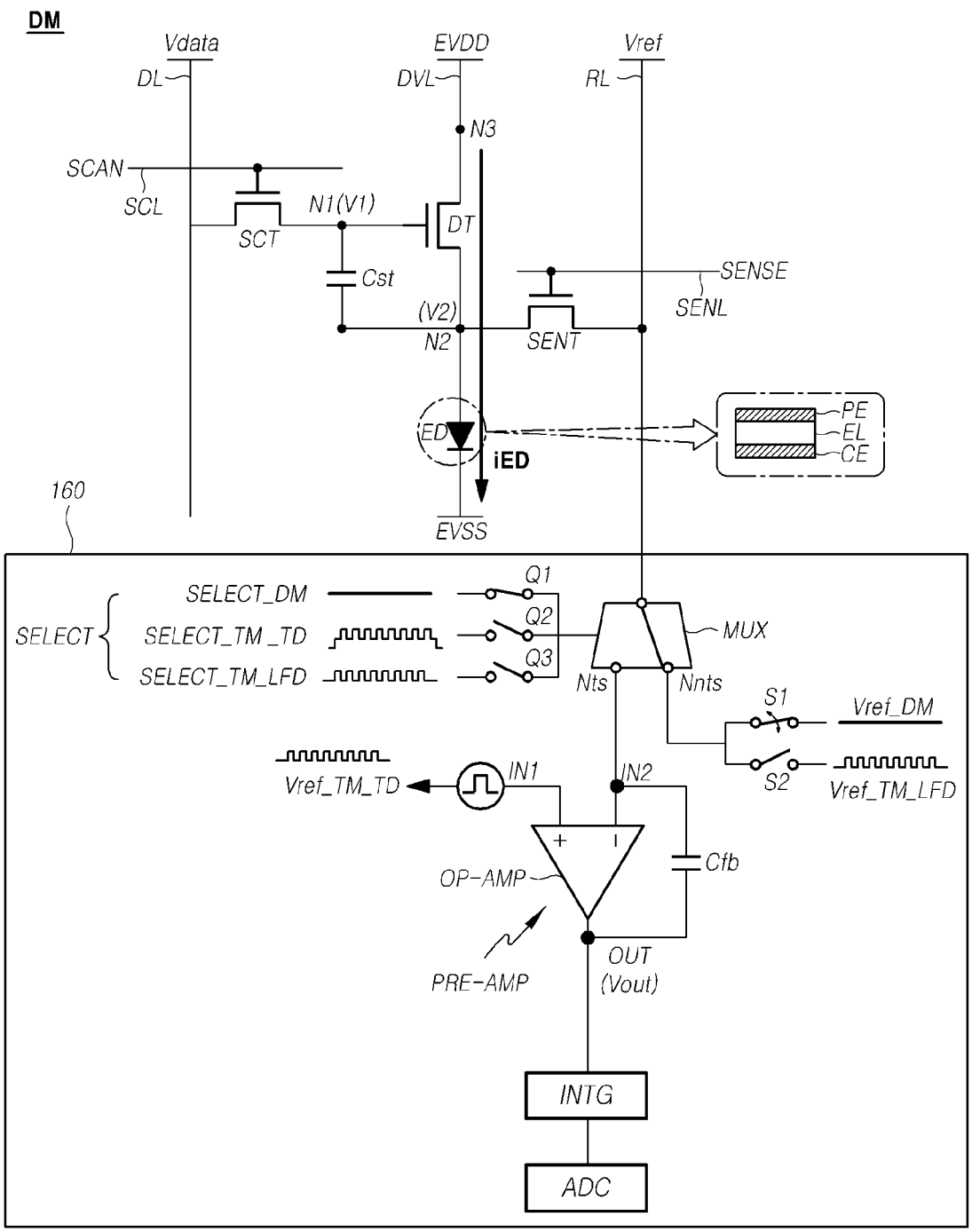
FIG. 6 is a diagram illustrating display driving of a touch display device according to exemplary embodiments of the present disclosure during a display mode period.

FIG. 6 is a diagram illustrating display driving of the touch display device 100 according to the exemplary embodiments of the present disclosure during the display mode period DM.

Referring to FIG. 6, during the display mode period DM in which the touch display device 100 according to the exemplary embodiments of the present disclosure operates in a display mode, the scan transistor SCT may be turned on by a scan signal SCAN having a turn-on level so that a data voltage Vdata supplied to the data line DL may be applied to the first node N1 of a driving transistor DT.

During the display mode period DM, the sense transistor SENT is turned on by a sense signal SENSE having a turn-on level. In addition, during the display mode period DM, the reference signal Vref_DM for a display mode may be supplied to the reference line RL.

Accordingly, the reference signal Vref_DM for a display mode supplied to the reference line RL may be applied to the second node N2 of the driving transistor DT through the sense transistor SENT that is turned on.

In order to supply the reference signal Vref_DM for a display mode to the reference line RL during the display mode period DM, the first selection switch Q1 and the first reference switch S1 are turned on.

When the first selection switch Q1 is turned on, the multiplexer MUX may receive a selection signal SELECT_DM for a display mode. Therefore, the reference line RL and the non-touch sensing node Nnts are connected by the multiplexer MUX.

When the first reference switch S1 is turned on, the reference signal Vref_DM for a display mode is applied to the non-touch sensing node Nnts. Therefore, the reference signal Vref_DM for a display mode may be supplied to the reference line RL connected to the non-touch sensing node Nnts.

After the data voltage Vdata and the reference signal Vref_DM for a display mode are applied to the first node N1 and the second node N2 of the driving transistor DT, respectively, the scan transistor SCT and the sense transistor SENT are turned off.

Accordingly, a voltage of each of the first node N1 and the second node N2 of the driving transistor DT is boosted. When the voltage of the second node N2 of the driving transistor DT is increased to a certain level or more, a driving current iED is supplied to the light-emitting device ED and the light-emitting device ED emits light.

In the following, during the touch mode period TM, a touch driving operation for touch sensing and an LFD operation while the touch driving operation is performed will be described with reference to FIGS. 8 to 15. In order to describe the above, an example of a structure of a touch sensor and a driving environment will be described first with reference to FIG. 7.

Before the description thereof, as described above, in the touch display device 100 according to the exemplary embodiments of the present disclosure, the pixel electrode PE for display serves as a touch electrode.

One pixel electrode PE may serve as one touch electrode, or two or more pixel electrodes PE may serve as one touch electrode.

Figure 7:
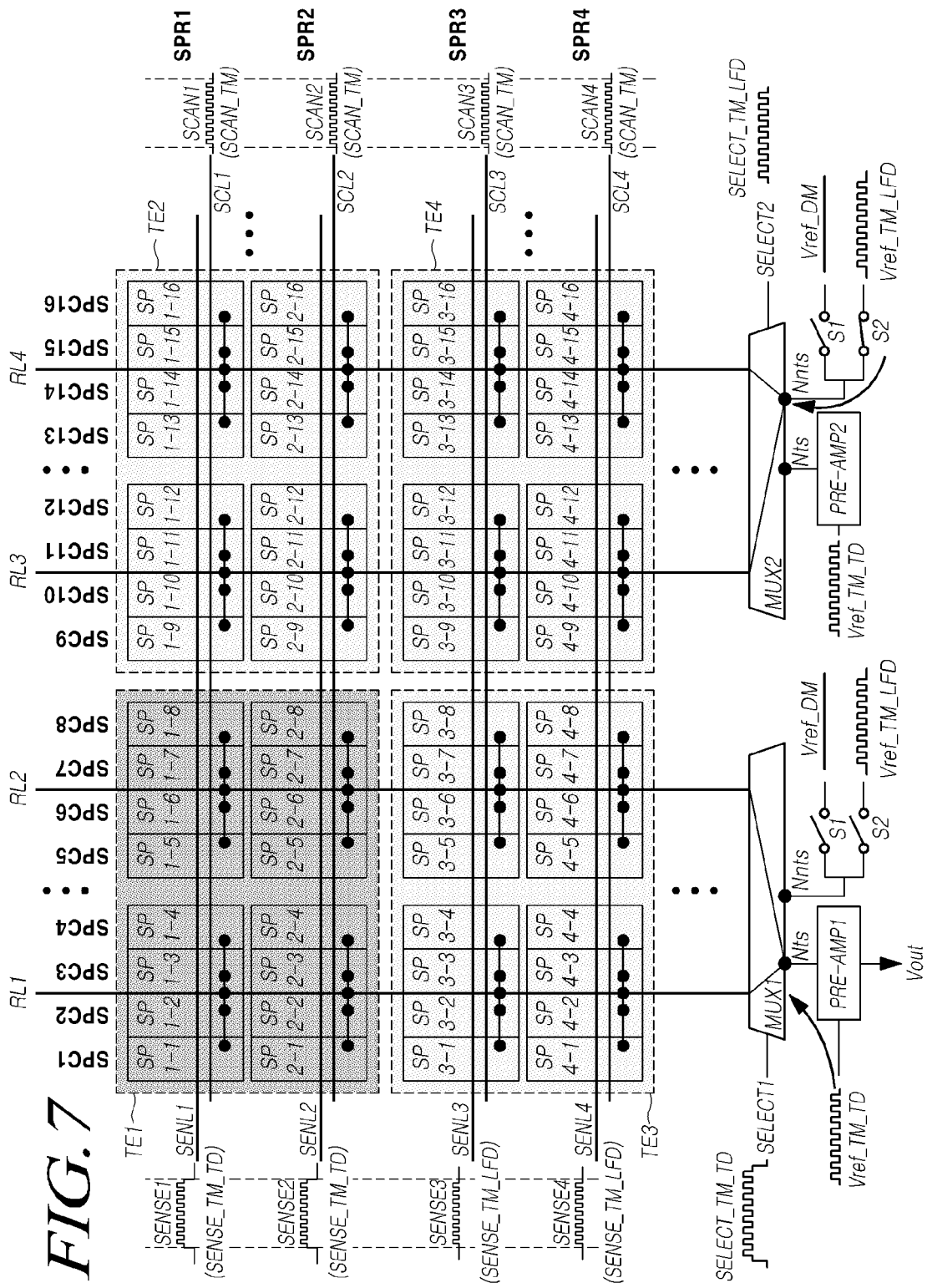
FIG. 7 is an exemplary diagram illustrating a driving situation in a touch mode of a touch display device according to exemplary embodiments of the present disclosure.

FIG. 7 is an exemplary diagram illustrating a driving situation in the touch mode of the touch display device 100 according to the exemplary embodiments of the present disclosure.

According to the example of FIG. 7, in the display panel 110, a first subpixel row SPR1 includes 16 subpixels SP1-1 to SP1-16, a second subpixel row SPR2 includes 16 subpixels SP2-1 to SP2-16, a third subpixel row SPR3 includes 16 subpixels SP3-1 to SP3-16, and a fourth subpixel row SPR4 includes 16 subpixels SP4-1 to SP4-16.

Referring to FIG. 7, a first scan line SCL1 for transmitting a first scan signal SCAN1 and a first sense line SENL1 for transmitting a first sense signal SENSE1 are disposed in the first subpixel row SPR1. A second scan line SCL2 for transmitting a second scan signal SCAN2 and a second sense line SENL2 for transmitting a second sense signal SENSE2 are disposed in the second subpixel row SPR2. A third scan line SCL3 for transmitting a third scan signal SCAN3 and a third sense line SENL3 for transmitting a third sense signal SENSE3 are disposed in the third subpixel row SPR3. A fourth scan line SCL4 for transmitting a fourth scan signal SCAN4 and a fourth sense line SENL4 for transmitting a fourth sense signal SENSE4 are disposed in the fourth subpixel row SPR4.

The display panel 110 illustrated in FIG. 7 includes 16 subpixel columns SPC1 to SPC16. A first subpixel column SPC1 among the 16 subpixel columns SPC1 to SPC16 includes four subpixels SP1-1, SP2-1, SP3-1, and SP4-1. A second subpixel column SPC2 among the 16 subpixel columns SPC1 to SPC16 includes four subpixels SP1-2, SP2-2, SP3-2, and SP4-2. A third subpixel column SPC3 among the 16 subpixel columns SPC1 to SPC16 includes four subpixels SP1-3, SP2-3, SP3-3, and SP4-3. A fourth subpixel column SPC4 among the 16 subpixel columns SPC1 to SPC16 includes four subpixels SP1-4, SP2-4, SP3-4, and SP4-4.

Referring to FIG. 7, when the display panel 110 has a reference line sharing structure as illustrated in FIG. 3, four reference lines RL1 to RL4 are disposed in a region in which the 16 subpixel columns SPC1 to SPC16 are arranged.

First to fourth subpixel columns SPC1 to SPC4 share a first reference line RL1. Fifth to eighth subpixel columns SPC5 to SPC8 share a second reference line RL2. Ninth to twelfth subpixel columns SPC9 to SPC12 share a third reference line RL3. Thirteenth to sixteenth subpixel columns SPC13 to SPC16 share a fourth reference line RL4.

In the display panel 110 of the touch display device 100 according to the exemplary embodiments of the present disclosure, a plurality of touch electrodes TE1, TE2, TE3, and TE4 may be present. Each of the plurality of touch electrodes TE1, TE2, TE3, and TE4 may include one pixel electrode PE or two or more pixel electrodes PE.

According to the example of FIG. 7, 16 pixel electrodes PE included in the 16 subpixels SP serve as one touch electrode. In other words, the 16 pixel electrodes PE included in the 16 subpixels serve as one touch electrode.

Referring to FIG. 7, the 16 pixel electrodes PE included in the 16 subpixels SP1-1 to SP1-8 and SP2-1 to SP2-8, which are located in the first and second subpixel rows SPR1 and SPR2 and the first to eighth subpixel columns SPC1 to SPC8, constitute a first touch electrode TE1.

Further, the 16 pixel electrodes PE included in the 16 subpixels SP1-9 to SP1-16 and SP2-9 to SP2-16, which are located in the first and second subpixel rows SPR1 and SPR2 and the ninth to sixteenth subpixel columns SPC9 to SPC16, constitute a second touch electrode TE2.

Further, the 16 pixel electrodes PE included in the subpixels SP3-1 to SP3-8 and SP4-1 to SP4-8, which are located in the third and fourth subpixel rows SPR3 and SPR4 and the first to eighth subpixel columns SPC1 to SPC8, constitute a third touch electrode TE3.

Further, the 16 pixel electrodes PE included in the 16 subpixels SP3-9 to SP3-16 and SP4-9 to SP4-16, which are located in the third and fourth subpixel rows SPR3 and SPR4 and the ninth to sixteenth subpixel columns SPC9 to SPC16, constitute a fourth touch electrode TE4.

According to the above-described touch electrode configuration, the sensing circuit 160 may include a first multiplexer MUX1 connected to the first reference line RL1 and the second reference line RL2, a first pre-amplifier PRE-AMP1 connected to the first multiplexer MUX1, a second multiplexer MUX2 connected to the third reference line RL3 and the fourth reference line RL4, and a second pre-amplifier PRE-AMP2 connected to the second multiplexer MUX2.

During the touch mode period TM, the first to fourth scan signals SCAN1, SCAN2, SCAN3, and SCAN4 may be scan signals SCAN_TM for a touch mode of which a voltage level is variable. A voltage level of the scan signal SCAN_TM for a touch mode is variable within a turn-off level voltage range in which the scan transistor SCT may be turned off. At least one of a frequency, a phase, and an amplitude of the scan signal SCAN_TM for a touch mode may correspond to that of the reference signal Vref_TM_TD for touch driving.

According to the above-described arrangement of the touch electrodes, during the touch mode period TM, the first sense signal SENSE1 and the second sense signal SENSE2 are always identical to each other, and the third sense signal SENSE3 and the fourth sense signal SENSE4 are always identical to each other.

FIG. 7 illustrates an example of the case in which the touch driving for touch sensing is performed on the first touch electrode TE1 and the LFD for improving touch sensitivity is performed on the second to fourth touch electrodes TE2, TE3, and TE4.

Accordingly, at least two conditions should be satisfied during the touch mode period TM.

As a first condition, during the touch mode period TM, the first sense signal SENSE1 and the second sense signal SENSE2, which are supplied to the first sense line SENL1 and the second sense line SENL2 which are connected to the subpixels including the pixel electrodes PE constituting the first touch electrode TE1, are sense signals SENSE_TM_TD for touch driving. Further, the third sense signal SENSE3 and the fourth sense signal SENSE4, which are supplied to the third sense line SENL3 and the fourth sense line SENL4 which are not connected to the subpixels including the pixel electrodes PE constituting the first touch electrode TE1, are sense signals SENSE_TM_LFD for LFD.

The sense signal SENSE_TM_TD for touch driving and the sense signal SENSE_TM_LFD for LFD are signals having the same frequency, the same phase, and the same amplitude, and having the voltage level changing in the same pattern. However, the voltage level of the sense signal SENSE_TM_TD for touch driving is variable within a turn-on level voltage range in which the sense transistors SENT may be turned on, whereas the voltage level of the sense signal SENSE_TM_LFD for LFD is variable within a turn-off level voltage range in which the sense transistors SENT may be turned off.

For example, when the sense transistors SENT are N-type transistors, a low-level voltage of the sense signal SENSE_TM_TD for touch driving may be higher than a high-level voltage of the sense signal SENSE_TM_LFD for LFD. Conversely, when the sense transistors SENT are P-type transistors, a high-level voltage of the sense signal SENSE_TM_TD for touch driving may be lower than a low-level voltage of the sense signal SENSE_TM_LFD for LFD.

As a second condition, during the touch mode period TM, the first reference line RL1 and the second reference line RL2, which are connected to the subpixels including the pixel electrodes constituting the first touch electrode TE1, should be electrically connected to the first pre-amplifier PRE-AMP1 that can actually detect a signal at a current touch sensing timing. Further, the third reference line RL3 and the second reference line RL4, which are not connected to the subpixels including the pixel electrodes constituting the first touch electrode TE1, should not be electrically connected to the first pre-amplifier PRE-AMP1 that can actually detect the signal at the current touch sensing timing.

In order to satisfy the second condition, when the second selection switch Q2 is turned on, the first multiplexer MUX1 receives a first selection signal SELECT1 in a selection signal SELECT_TM_TD type for touch driving and should allow the first reference line RL1 and the second reference line RL2 to be connected to the touch sensing node Nts. In this case, the first and second reference switches S1 and S2 are in a turned-off state.

Accordingly, the first pre-amplifier PRE-AMP1 may supply the reference signal Vref_TM_TD for touch driving to the first reference line RL1 and the second reference line RL2, and sense the pixel electrodes PE overlapping the region of the first touch electrode TE1 to output the output signal Vout through the first reference line RL1 and the second reference line RL2.

In order to satisfy the second condition, when the third selection switch Q3 is turned on, the second multiplexer MUX2 receives a second selection signal SELECT2 in a selection signal SELECT_TM_LFD type for LFD and should allow the third reference line RL3 and the fourth reference line RL4 to be connected to the non-touch sensing node Nnts. In this case, the second reference switch S2 among the first and second reference switches S1 and S2 is in a turned-on state.

Accordingly, the reference signal Vref_TM_LFD for LFD is applied to the non-touch sensing node Nnts through the second reference switch S2 that is turned on. Further, the reference signal Vref_TM_LFD for LFD is supplied to the third reference line RL3 and the fourth reference line RL4 which are connected to the non-touch sensing node Nnts.

Further, the third reference line RL3 and the fourth reference line RL4 are not electrically connected to the second pre-amplifier PRE-AMP2. Of course, the third reference line RL3 and the fourth reference line RL4 are not connected to the first pre-amplifier PRE-AMP1, which supplies the reference signal Vref_TM_TD for touch driving and senses the pixel electrodes PE in the region of the first touch electrode TE1.

In order to generalize a size of one touch electrode, each of the plurality of reference lines RL may be shared by K subpixel SP columns (here, K is a natural number greater than or equal to 2). When the reference signal Vref_TM_TD for touch driving having a turn-on level is supplied to M reference lines RL (here, M is a natural number greater than or equal to 2) among the plurality of reference lines RL at the same timing and the sense signal for touch driving having a turn-on level is supplied to N sense lines (here, N is a natural number greater than or equal to 2) among the plurality of sense lines at the same timing, K*M*N pixel electrodes PE included in K*M*N subpixels SP among the plurality of subpixels SP may constitute one touch electrode.

In the following, in the driving environment of FIG. 7, a touch driving method and a LFD method, and a subpixel driving method associated therewith will be described in more detail.

The touch driving will be described in more detail with reference to FIGS. 8 and 9 in consideration of the subpixel SP1-1 including one of the pixel electrodes PE disposed in the region of the first touch electrode TE1. The LFD will be described in more detail with reference to FIGS. 10 and 11 in consideration of the subpixel SP3-1 including one of the pixel electrodes PE disposed in the region of the third touch electrode TE3. The LFD will be described in more detail with reference to FIGS. 12 and 13 in consideration of the subpixel SP1-9 including one of the pixel electrodes PE disposed in the region of the second touch electrode TE2. The LFD will be described in more detail with reference to FIGS. 14 and 15 in consideration of the subpixel SP3-9 including one of the pixel electrodes PE disposed in the region of the fourth touch electrode TE4. Hereinafter, as a portion illustrated as a circle in FIG. 4, the driving timing diagram illustrates a driving timing for the subpixels through which light is emitted by proceeding the display mode period DM, the light emission is stopped during the touch mode period TM, and then the light is re-emitted by proceeding the display mode period DM again.

Figure 8:
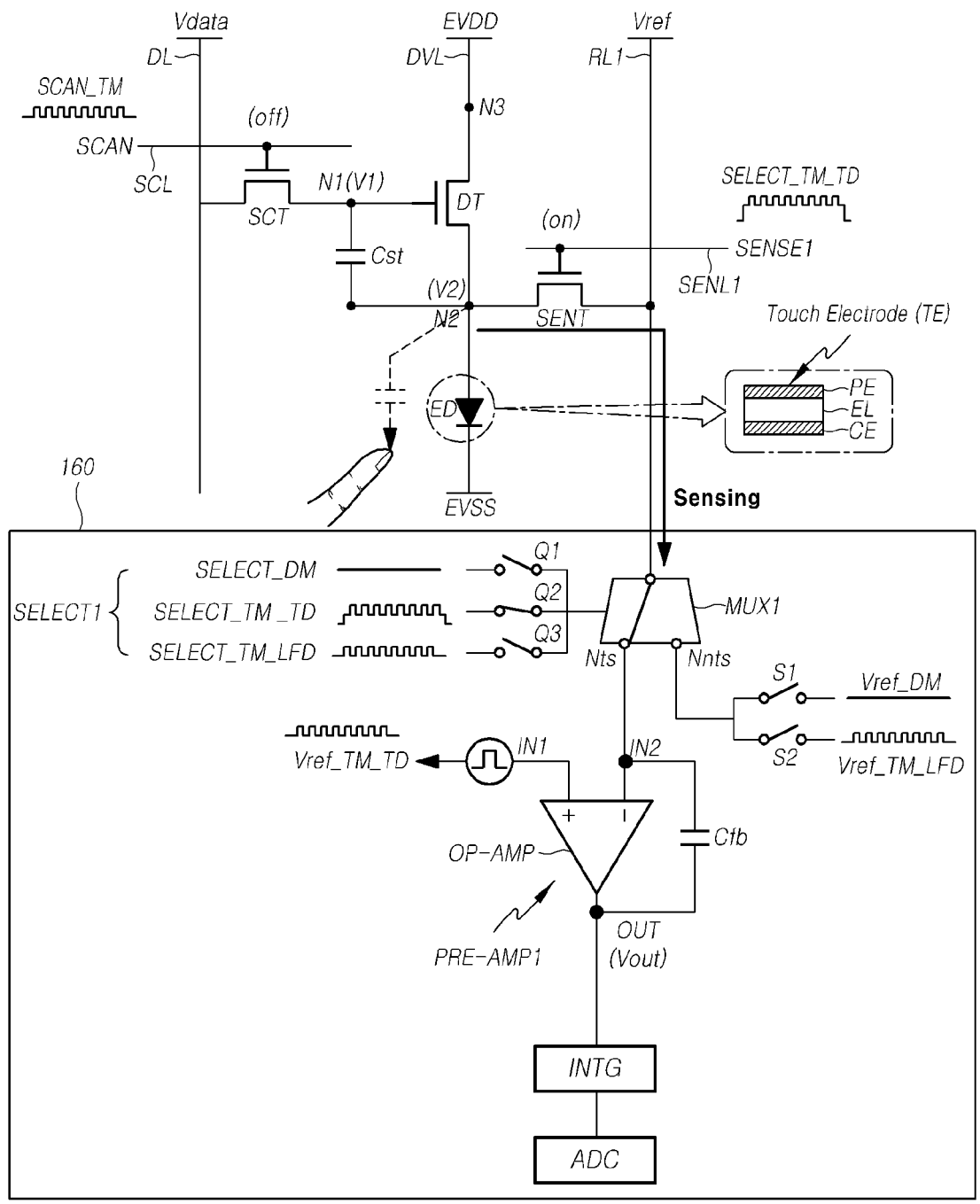
FIG. 8 is a diagram of touch driving for touch sensing during a touch mode period of a touch display device according to exemplary embodiments of the present disclosure.

FIG. 8 is a diagram illustrating touch driving for touch sensing during the touch mode period TM of the touch display device 100 according to the exemplary embodiments of the present disclosure. FIG. 9 is a timing diagram of the touch driving for touch sensing during the touch mode period TM of the touch display device 100 according to the exemplary embodiments of the present disclosure.

A touch driving method for sensing the pixel electrodes PE disposed in the region of the first touch electrode TE1 during the touch mode period TM and a driving method of corresponding subpixels will be described with reference to FIGS. 8 and 9. To this end, the first subpixel SP1-1 including one of the pixel electrodes PE disposed in the region of the first touch electrode TE1 is used as an example.

Figure 9:
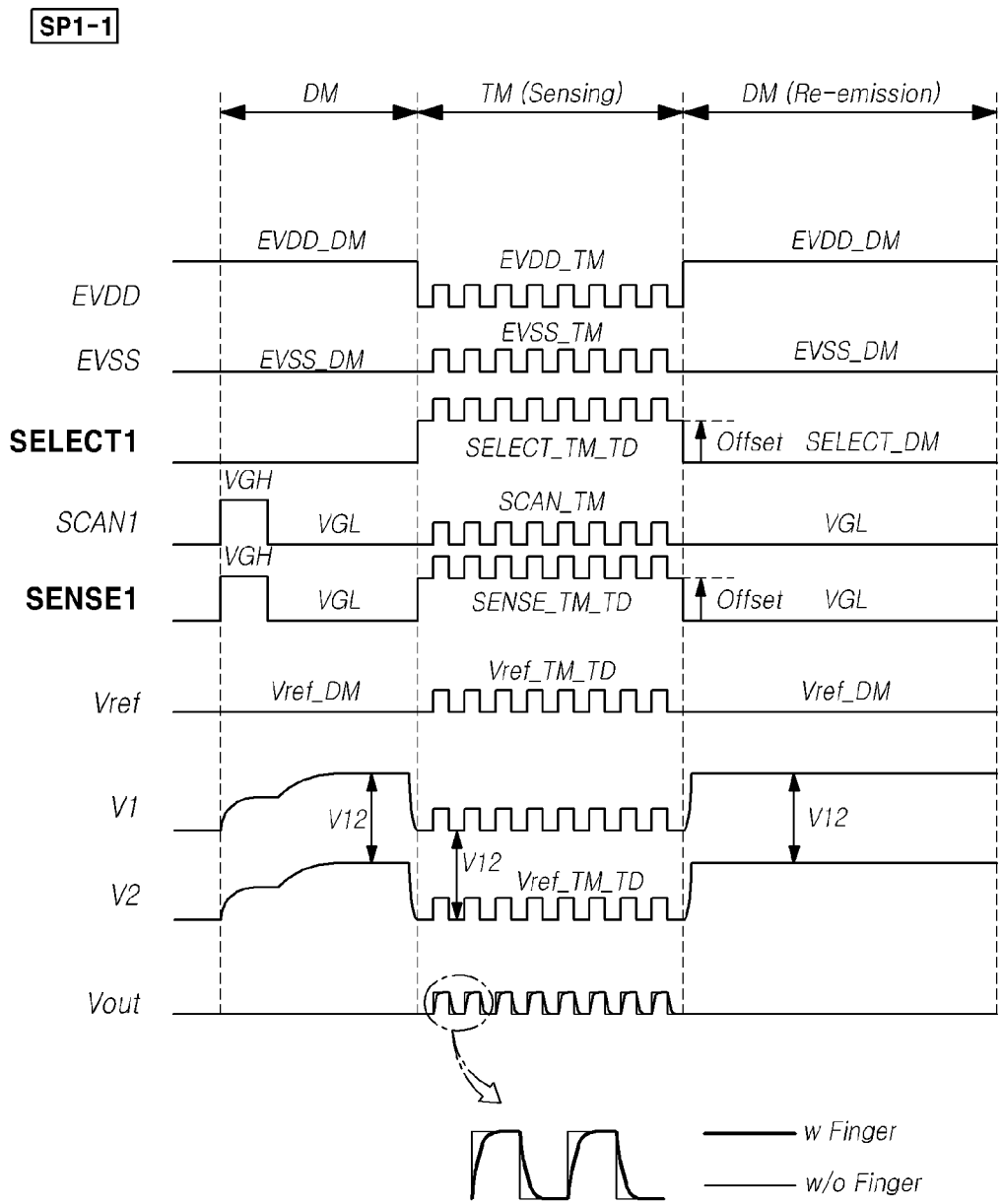
FIG. 9 is a timing diagram illustrating touch driving for touch sensing during a touch mode period of a touch display device according to exemplary embodiments of the present disclosure.

Referring to FIGS. 8 and 9, the sensing circuit 160 included in the touch display device 100 according to the exemplary embodiments of the present disclosure is connected to the first pixel electrode PE included in the first subpixel SP1-1, which is a touch sensing target, among the plurality of subpixels SP during the touch mode period TM, applies the reference signal Vref_TM_TD for touch driving of which the voltage level is variable to the first pixel electrode PE, and senses the first pixel electrode PE.

In the following, signal waveforms for touch driving during the touch mode period TM and signal waveforms during the display mode period DM with respect to various types of signals EVDD, EVSS, SELECT1, SCAN1, SENSE1, and Vref will be described with reference to FIGS. 8 and 9.

The driving voltage EVDD, which is supplied to the driving line DVL during the display mode period DM, is a driving voltage EVDD_DM for a display mode, which is a DC voltage type and has a constant voltage level.

The driving voltage EVDD, which is supplied to the driving line DVL during the touch mode period TM, is a driving voltage EVDD_TM for a touch mode which is an AC voltage type and of which a voltage level is variable.

At least one of a frequency, a phase, and an amplitude of the driving voltage EVDD_TM for a touch mode may correspond to that of the reference signal Vref_TM_TD for touch driving.

For example, the frequency, the phase, and the amplitude of the driving voltage EVDD_TM for a touch mode may be identical to those of the reference signal Vref_TM_TD for touch driving or may be slightly different from those of the reference signal Vref_TM_TD for touch driving only within a predetermined tolerance range.

The voltage level of the driving voltage EVDD_TM for a touch mode may be variable within a range in which the driving transistor DT is turned off. Accordingly, during the touch mode period TM, the driving transistor DT in the first subpixel SP1-1 may be in a turned-off state. During the touch mode period TM, the light-emitting device ED in the first subpixel SP1-1 may be in a non-emission state.

The base voltage EVSS applied to the common electrode CE during the display mode period DM is a base voltage EVSS_DM for a display mode, which is a DC voltage type and has a constant voltage level.

The base voltage EVSS applied to the common electrode CE during the touch mode period TM is a base voltage EVSS_TM for a touch mode which is an AC voltage type and of which at least one of a frequency, a phase, and an amplitude corresponds to that of the reference signal Vref_TM_TD for touch driving and a voltage level thereof is changed.

For example, the frequency, the phase, and the amplitude of the base voltage EVSS_TM for a touch mode may be identical to those of the reference signal Vref_TM_TD for touch driving or may be slightly different from those of the reference signal Vref_TM_TD for touch driving only within a predetermined tolerance range.

The first scan signal SCAN1 has a turn-on level gate voltage VGH at a predetermined timing during the display mode period DM and has a turn-off level gate voltage VGL during the remaining period.

During the touch mode period TM, the first scan signal SCAN1 may be a scan signal SCAN_TM for a touch mode. Accordingly, the scan transistor SCT in the first subpixel SP1-1 is in a turned-off state.

The scan signal SCAN_TM for a touch mode may be an LFD signal of which at least one of a frequency, a phase, and an amplitude corresponds to that of the reference signal Vref_TM_TD for touch driving and a voltage level thereof is changed. For example, the frequency, the phase, and the amplitude of the scan signal SCAN_TM for a touch mode may be identical to those of the reference signal Vref_TM_TD for touch driving, or may be slightly different from those of the reference signal Vref_TM_TD for touch driving only within a predetermined tolerance range.

During the display mode period DM in which light is re-emitted after the touch mode period TM, the first scan signal SCAN1 has a turn-off level gate voltage VGL.

The first sense signal SENSE1 has a turn-on level gate voltage VGH at a predetermined timing during the display mode period DM and has a turn-off level gate voltage VGL during the remaining period.

During the touch mode period TM, the first sense signal SENSE1 may be a sense signal SENSE_TM_TD for touch driving.

At least one of a frequency, a phase, and an amplitude of the sense signal SENSE_TM_TD for touch driving may correspond to that of the reference signal Vref_TM_TD for touch driving and a voltage level of the sense signal SENSE_TM_TD for touch driving may be changed. For example, the frequency, the phase, and the amplitude of the sense signal SENSE_TM_TD for touch driving may be identical to those of the reference signal Vref_TM_TD for touch driving or may be slightly different from those of the reference signal Vref_TM_TD for touch driving only within a predetermined tolerance range.

The voltage level of the sense signal SENSE_TM_TD for touch driving may be variable within a turn-on level voltage range. Accordingly, the sense transistor SENT in the first subpixel SP1-1 is turned on so that the first pixel electrode PE in the first subpixel SP1-1 is electrically connected to the first reference line RL1.

The voltage level of the sense signal SENSE_TM_TD for touch driving may be changed based on a voltage offset from a turn-off level gate voltage VGL in the display mode period DM.

During the display mode period DM in which light is re-emitted after the touch mode period TM, the first sense signal SENSE1 has a turn-off level gate voltage VGL.

The reference signal Vref supplied to the first reference line RL1 during the display mode period DM is a reference signal Vref_DM for a display mode.

The reference signal Vref, which is supplied to the first reference line RL1 that should be electrically connected to the pixel electrodes PE constituting the first touch electrode TE1 which is a touch sensing target during the touch mode period TM is a reference signal Vref_TM_TD for touch driving. Here, the reference signal Vref_TM_TD for touch driving corresponds to a substantial touch driving signal (a touch sensing signal) applied to the first pixel electrode PE through the first reference line RL1.

The reference signal Vref_TM_TD for touch driving is supplied to the first reference line RL1 through the first pre-amplifier PRE-AMP1.

The reference signal Vref_TM_TD for touch driving is output from the first pre-amplifier PRE-AMP1 and input to the touch sensing node Nts of the first multiplexer MUX1. The first multiplexer MUX1 connects the touch sensing node Nts to the first reference line RL1 in response to the first selection signal SELECT1. Accordingly, the reference signal Vref_TM_TD for touch driving which is input to the touch sensing node Nts is supplied to the first reference line RL1.

The first selection signal SELECT1 which is input to the first multiplexer MUX1 during the display mode period DM is a selection signal SELECT_DM for a display mode. To this end, the first selection switch Q1 is turned on.

The first selection signal SELECT1 which is input to the first multiplexer MUX1 during the touch mode period TM is a selection signal SELECT_TM_TD for a touch driving mode. To this end, the second selection switch Q2 is turned on.

At least one of a frequency, a phase, and an amplitude of the selection signal SELECT_TM_TD for a touch driving mode may correspond to that of the reference signal Vref_TM_TD for touch driving and a voltage level of the selection signal SELECT_TM_TD for a touch driving mode may be changed. For example, the frequency, the phase, and the amplitude of the selection signal SELECT_TM_TD for a touch driving mode may be identical to those of the reference signal Vref_TM_TD for touch driving or may be slightly different from those of the reference signal Vref_TM_TD for touch driving only within a predetermined tolerance range.

The voltage level of the selection signal SELECT_TM_TD for a touch driving mode is changed based on a voltage offset from the voltage of the selection signal SELECT_DM for a display mode.

Referring to FIGS. 8 and 9, according to the above-described signals EVDD, EVSS, SCAN1, SENSE1, Vref, and SELECT1 during the touch mode period TM, the first pixel electrode PE in the first subpixel SP1-1 is selected as the first touch electrode TE1 during the touch mode period TM. The scan transistor SCT in the first subpixel SP1-1 is turned off by the first scan signal SCAN1 in a scan signal SCAN_TM type for a touch mode having a turn-off level, which is applied to the gate node, through a corresponding first scan line SCL1 among the plurality of scan lines SCL. The sense transistor SENT in the first subpixel SP1-1 is turned on by the first sense signal SENSE1 in a sense signal SENSE_TM_TD type for touch driving having a turn-on level, which is applied to the gate node, through a corresponding first sense line SENL1 among the plurality of sense lines SENL. Further, the first pixel electrode PE in the first subpixel SP1-1 is electrically connected to the first reference line RL1 among the plurality of reference lines RL, to which the reference signal Vref_TM_TD for touch driving is supplied, through the sense transistor SENT in the first subpixel SP1-1. The first reference line RL1 is electrically connected to the first pre-amplifier PRE-AMP1 in the sensing circuit 160. The reference signal Vref_TM_TD for touch driving supplied to the first reference line RL1 is applied to the first pixel electrode PE through the sense transistor SENT in the first subpixel SP1-1.

Referring to FIGS. 8 and 9, a voltage level of the first scan signal SCAN1 in a scan signal SCAN_TM type for a touch mode having a turn-off level, which is applied to the gate node of the scan transistor SCT in the first subpixel SP1-1 during the touch mode period TM, is changed such that a frequency, a phase, and an amplitude of the first scan signal SCAN1 correspond to those of the reference signal Vref_TM_TD for touch driving, and the voltage level of the first scan signal SCAN1 is variable within a turn-off level voltage range.

Referring to FIGS. 8 and 9, a voltage level of the first sense signal SENSE1 in a sense signal SENSE_TM_TD type for touch driving having a turn-on level, which is applied to the gate node of the sense transistor SENT in the first subpixel SP1-1 during the touch mode period TM, is changed such that a frequency, a phase, and an amplitude of the first sense signal SENSE1 correspond to those of the reference signal Vref_TM_TD for touch driving, and the voltage level of the first sense signal SENSE1 is offset from the turn-off level voltage and is variable within a turn-on level voltage range.

Referring to FIGS. 8 and 9, during the touch mode period TM, the reference signal Vref_TM_TD for touch driving is applied to the second node N2 of the driving transistor DT which is electrically connected to the first pixel electrode PE in the first subpixel SP1-1. Further, the first node N1 of the driving transistor DT has a voltage state in which a voltage level is changed in synchronization with the reference signal Vref_TM_TD for touch driving applied to the second node N2 of the driving transistor DT.

During the touch mode period TM, the driving transistor DT in the first subpixel SP1-1 may be in a turned-off state. During the touch mode period TM, the light-emitting device ED in the first subpixel SP1-1 may be in a non-emission state.

Referring to FIGS. 8 and 9, respective voltage states and voltage values V1 and V2 of two nodes N1 and N2 of the storage capacitor Cst in the first subpixel SP1-1 during the touch mode period TM are changed in comparison to those before the touch mode period TM (i.e., DM before TM) and are different from those after the touch mode period TM (i.e., DM after TM).

Referring to FIGS. 8 and 9, the respective voltage values V1 and V2 of the two nodes N1 and N2 of the storage capacitor Cst in the first subpixel SP1-1 during the touch mode period TM may be lower than the respective voltage values V1 and V2 of the two nodes N1 and N2 of the storage capacitor Cst in the first subpixel SP1-1 right before the start of the touch mode period TM (at a end point of the display mode period DM before the touch mode period TM).

Further, the respective voltage values V1 and V2 of the two nodes N1 and N2 of the storage capacitor Cst in the first subpixel SP1-1 during the display mode period DM after the touch mode period TM may be higher than the respective voltage values V1 and V2 of the two nodes N1 and N2 of the storage capacitor Cst in the first subpixel SP1-1 during the touch mode period TM.

Referring to FIGS. 8 and 9, a voltage difference V12 between the two nodes of the storage capacitor Cst in the first subpixel SP1-1 during the touch mode period TM corresponds to a voltage difference V12 between the two nodes of the storage capacitor Cst in the first subpixel SP1-1 before or after the touch mode period TM. As described above, the voltage difference V12 between the first node N1 and the second node N2 of the driving transistor DT during the touch mode period TM may correspond to the voltage difference V12 between the first node N1 and the second node N2 of the driving transistor DT during the display mode period DM.

In other words, the voltage difference V12 between the two nodes of the storage capacitor Cst in the first subpixel SP1-1 during the touch mode period TM remains identical to or substantially similar to the voltage difference V12 between the two nodes of the storage capacitor Cst in the first subpixel SP1-1 before or after the touch mode period TM. Accordingly, the display is not affected by the touch driving.

Referring to FIG. 9, an output voltage Vout output from the first pre-amplifier PRE-AMP1 may be changed according to the present or absence of a touch by a finger (or a pen) in the vicinity of the first subpixel SP1-1. The output voltage Vout, which is output from the first pre-amplifier PRE-AMP1 when there is a touch by a finger (or a pen), has a signal waveform that rises more slowly and falls more slowly compared to the output voltage Vout, which is output from the first pre-amplifier PRE-AMP1 when there is no touch by a finger (or a pen).

Meanwhile, referring to FIG. 7, the pixel electrode PE in the second subpixel SP2-1 located in the second row and first column and the pixel electrode PE in the third subpixel SP1-5 located in the first row and the fifth column are pixel electrodes constituting the first touch electrode TE1 together with the pixel electrode PE in the first subpixel SP1-1 located in the first row and the first column.

Referring to FIG. 7, the second subpixel SP2-1 among the plurality of subpixels SP is electrically connected to the first reference line RL1 together with the first subpixel SP1-1, and is electrically connected to the second sense line SENL2 different from the first sense line SENL1.

The gate node of the sense transistor SENT in the second subpixel SP2-1 is connected to the second sense line SENL2, and the gate node of the sense transistor SENT in the first subpixel SP1-1 is connected to the first sense line SENL1.

During the touch mode period TM, the second sense signal SENSE2 in the sense signal SENSE_TM_TD type for touch driving having a turn-on level is supplied to the second sense line SENL2 at a timing when the first sense signal SENSE1 in the sense signal SENSE_TM_TD type for touch driving having a turn-on level is supplied to the first sense line SENL1. Therefore, the sense transistor SENT in the second subpixel SP2-1 and the sense transistor SENT in the first subpixel SP1-1 are simultaneously turned on.

When the first pixel electrode PE in the first subpixel SP1-1 is electrically connected to the first pre-amplifier PRE-AMP1 through the first reference line RL1, a second pixel electrode PE in the second subpixel SP2-1 may be electrically connected to the same first pre-amplifier PRE-AMP1 through the same first reference line RL1.

Referring to FIG. 7, the third subpixel SP1-5 among the plurality of subpixels SP is electrically connected to the second reference line RL2 adjacent to the first reference line RL1 and is electrically connected to the first sense line SENL1 together with the first subpixel SP1-1.

During the touch mode period TM, the second reference line RL2 is electrically connected to the first pre-amplifier PRE-AMP1 together with the first reference line RL1.

The gate node of the sense transistor SENT in the third subpixel SP1-5 is electrically connected to the first sense line SENL1 together with the gate node of the sense transistor SENT in the first subpixel SP1-1. Therefore, during the touch mode period TM, the sense transistor SENT in the third subpixel SP1-5 and the sense transistor SENT in the first subpixel SP1-1 are simultaneously turned on.

The first reference line RL1 and the second reference line RL2 may both be connected to the first multiplexer MUX1. When the first pixel electrode PE in the first subpixel SP1-1 is electrically connected to the first pre-amplifier PRE-AMP1 through the first reference line RL1, a third pixel electrode PE in the third subpixel SP1-5 is electrically connected to the first pre-amplifier PRE-AMP1 through the second reference line RL2.

The LFD, which is also performed when the touch driving described above with reference to FIGS. 8 and 9 is performed, will be described with reference to FIGS. 10 to 15. A description of the LFD will be given focusing on differences from the touch driving, and a description of the same content will be omitted. Further, when describing the LFD of FIGS. 10 to 15, a description of the LFD will be given focusing on differences between the LFD and the touch driving, and a description of the same content will be omitted.

Figure 10:
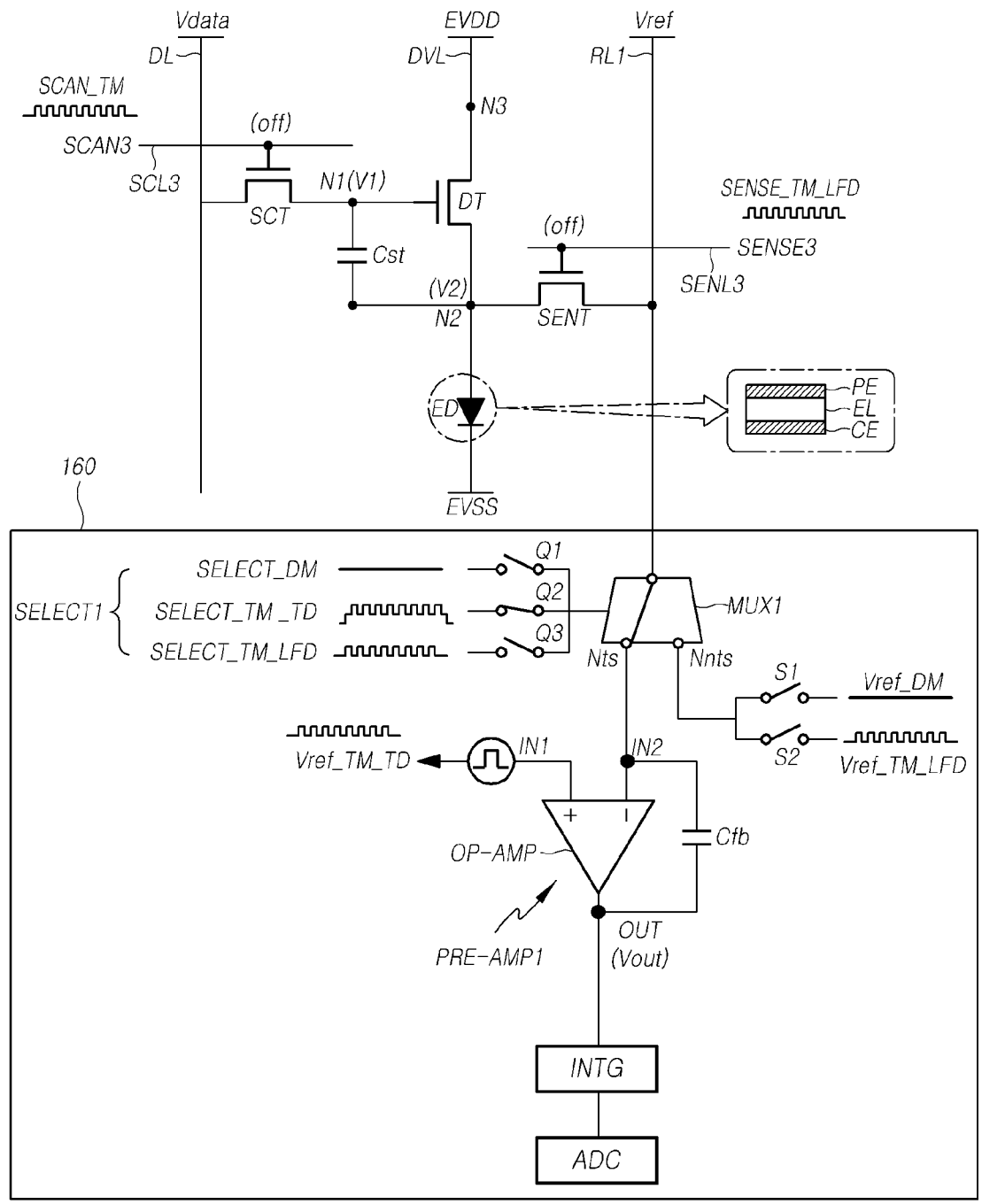
FIG. 10 is a diagram illustrating load-free driving during a touch mode period of a touch display device according to exemplary embodiments of the present disclosure.
Figure 11:
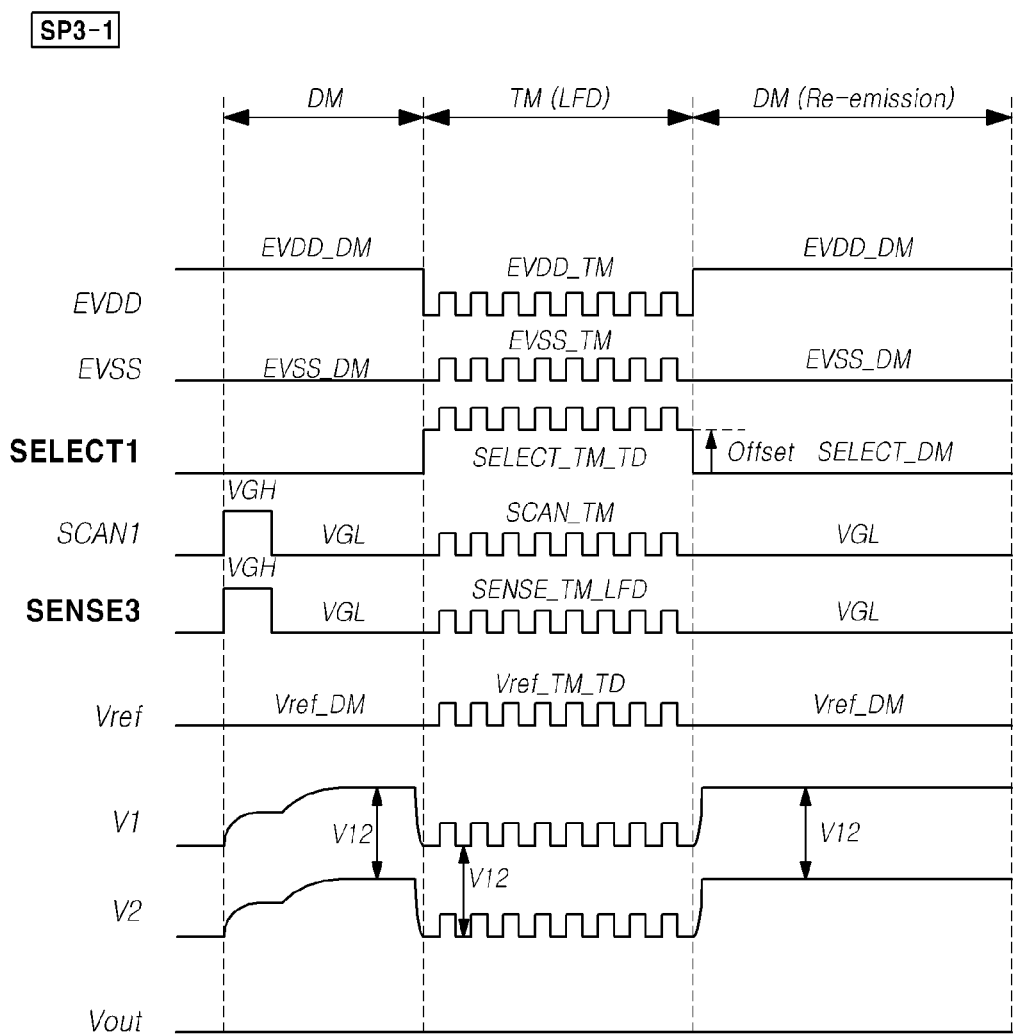
FIG. 11 is a timing diagram illustrating load-free driving during a touch mode period of a touch display device according to exemplary embodiments of the present disclosure.

FIG. 10 is a diagram illustrating the LFD during the touch mode period TM of the touch display device 100 according to the exemplary embodiments of the present disclosure. FIG. 11 is a timing diagram illustrating the LFD during the touch mode period TM of the touch display device 100 according to the exemplary embodiments of the present disclosure.

The driving for the fourth subpixel SP3-1 including one of the pixel electrodes PE disposed in the region of the third touch electrode TE3 and the LFD during the touch mode period TM will be described with reference to FIGS. 10 and 11.

Referring to FIGS. 10 and 11, the fourth subpixel SP3-1 among the plurality of subpixels SP is electrically connected to the first reference line RL1 and electrically connected to the third sense line SENL3 different from the first sense line SENL1.

During the touch mode period TM, the third sense signal SENSE3 in the sense signal SENSE_TM_LFD type for LFD having a turn-off level is supplied to the third sense line SENL3 at a timing when the first sense signal SENSE1 in the sense signal SENSE_TM_TD type for touch driving having a turn-on level is supplied to the first sense line SENL1.

When the sense transistor SENT in the first subpixel SP1-1 is turned on, the sense transistor SENT in the fourth subpixel SP3-1 is turned off.

Therefore, the first pixel electrode PE in the first subpixel SP1-1 is electrically connected to the first reference line RL1, but a fourth pixel electrode PE in the fourth subpixel SP3-1 is not electrically connected to the first reference line RL1. Here, the first reference line RL1 is in a state in which the reference signal Vref_TM_TD for touch driving is supplied.

Therefore, when the first pixel electrode PE in the first subpixel SP1-1 is electrically connected to the first pre-amplifier PRE-AMP1 through the first reference line RL1, the fourth pixel electrode PE in the fourth subpixel SP3-1 is not connected to the first reference line RL1 which is electrically connected to the first pre-amplifier PRE-AMP1.

The voltage level of the driving voltage EVDD_TM for a touch mode and the voltage level of the base voltage EVSS_TM for a touch mode are changed during the touch mode period TM, and thus the voltage of each of the first node N1 and the second node N2 of the driving transistor DT in the fourth subpixel SP3-1 is changed. However, the voltage difference V12 between the first node N1 and the second node N2 of the driving transistor DT in the fourth subpixel SP3-1 is identical or similar to the voltage difference V12 between the first node N1 and the second node N2 of the driving transistor DT in the fourth subpixel SP3-1 before or after the touch mode period TM.

The voltage level of the sense signal SENSE_TM_LFD for LFD having a turn-off level may be changed such that the frequency, the phase, and the amplitude of the sense signal SENSE_TM_LFD for LFD correspond to those of the sense signal SENSE_TM_TD for touch driving having a turn-on level, and the voltage level of the sense signal SENSE_TM_LFD for LFD may be variable within the turn-off level voltage range. For example, the sense signal SENSE_TM_TD for touch driving having a turn-on level may have a voltage which is offset than the sense signal SENSE_TM_LFD for LFD having a turn-off level.

Figure 12:
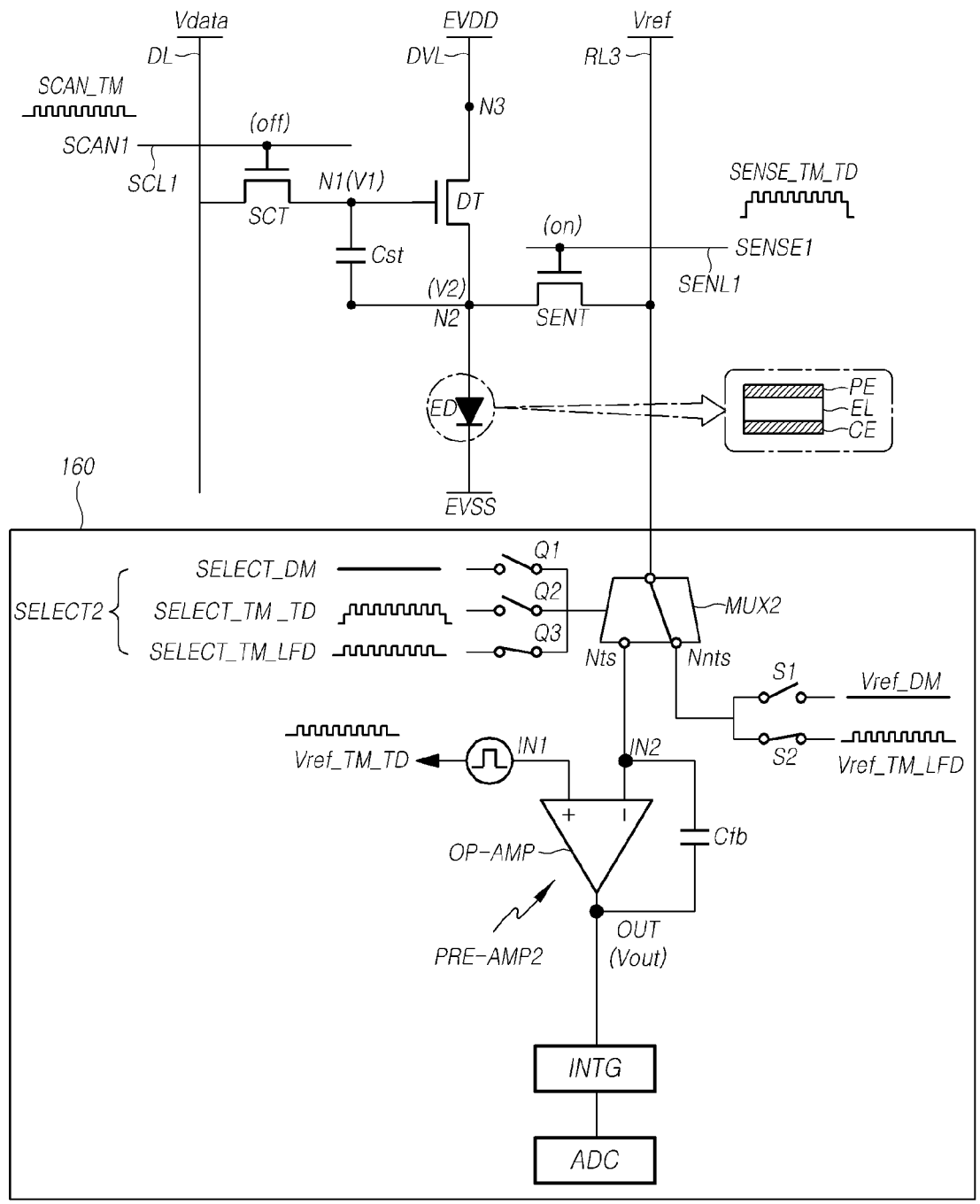
FIG. 12 is another diagram illustrating load-free driving during a touch mode period of a touch display device according to exemplary embodiments of the present disclosure.
Figure 13:
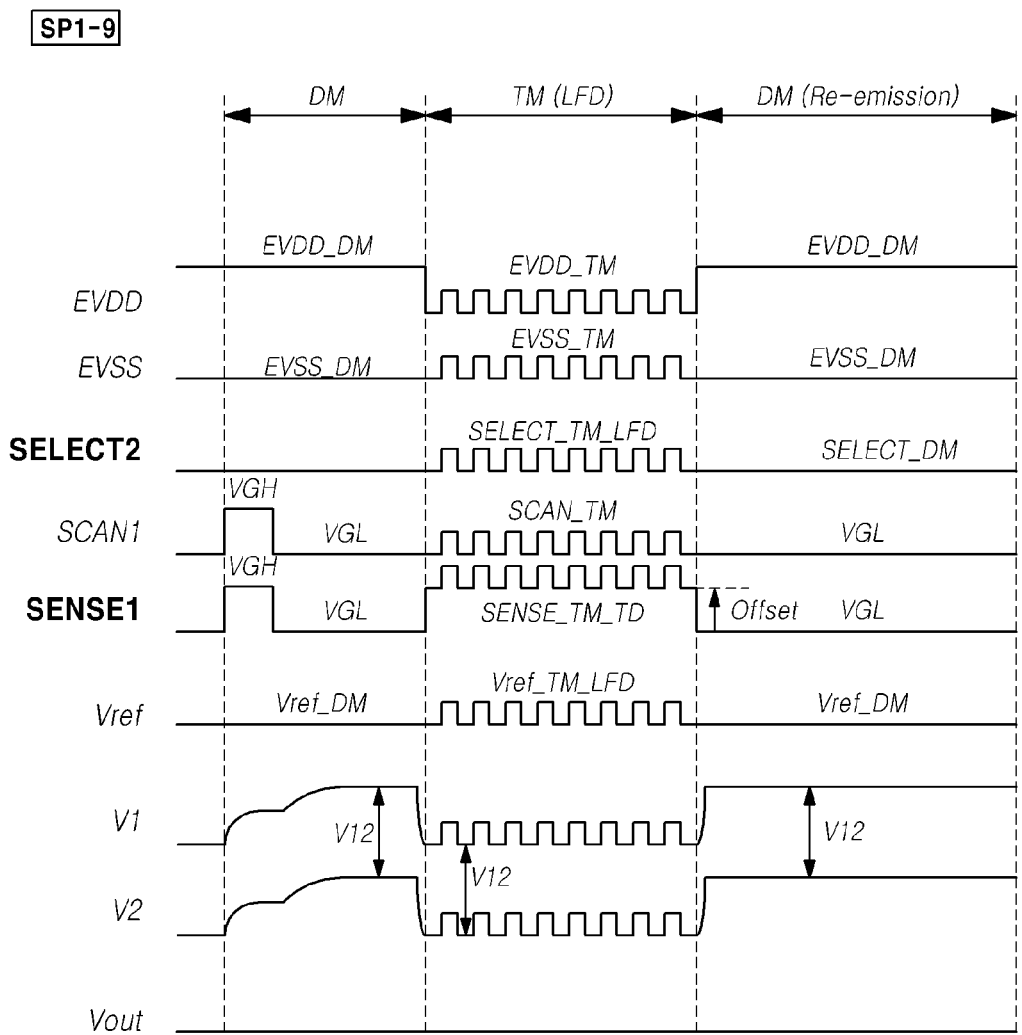
FIG. 13 is still another timing diagram illustrating load-free driving during a touch mode period of a touch display device according to exemplary embodiments of the present disclosure.

FIG. 12 is another diagram illustrating the LFD during the touch mode period TM of the touch display device 100 according to the exemplary embodiments of the present disclosure. FIG. 13 is still another timing diagram illustrating the LFD during the touch mode period TM of the touch display device 100 according to the exemplary embodiments of the present disclosure.

The driving for the fifth subpixel SP1-9 including one of the pixel electrodes PE disposed in the region of the second touch electrode TE2 and the LFD during the touch mode period TM will be described with reference to FIGS. 12 and 13.

Referring to FIGS. 12 and 13, the fifth subpixel SP1-9 among the plurality of subpixels SP may be electrically connected to the third reference line RL3 different from the first reference line RL1 and may be electrically connected to the first sense line SENL1 together with the first subpixel SP1-1.

The fifth subpixel SP1-9 is connected to the same first sense line SENL1 together with the first subpixel SP1-1.

Therefore, during the touch mode period TM, the sense transistor SENT in the fifth subpixel SP1-9 may be turned on together with the sense transistor SENT in the first subpixel SP1-1.

When the third selection switch Q3 is turned on, the second multiplexer MUX2 receives a second selection signal SELECT2 in a selection signal SELECT_TM_LFD type for LFD and allows the third reference line RL3 to be connected to the non-touch sensing node Nnts. Further, when the second reference switch S2 is turned on, the reference signal Vref_TM_LFD for LFD is applied to the non-touch sensing node Nnts and supplied to the third reference line RL3.

The pixel electrode PE in the fifth subpixel SP1-9 is connected to the third reference line RL3.

However, since the third reference line RL3 is not connected to the touch sensing node Nts, the third reference line RL3 is not connected to the second pre-amplifier PRE-AMP2. Further, the third reference line RL3 may not be connected to the first pre-amplifier PRE-AMP1 where signal selection is performed at a current timing.

When the reference signal Vref_TM_TD for touch driving is applied to the first reference line RL1, a reference signal Vref_TM_LFD for LFD of which a frequency, a phase, and an amplitude correspond to those of the reference signal Vref_TM_TD for touch driving is applied to the third reference line RL3.

The reference signal Vref_TM_LFD for LFD is supplied at a position different from that of the reference signal Vref_TM_TD for touch driving. The reference signal Vref_TM_TD for touch driving is supplied from the second pre-amplifier PRE-AMP2, and the reference signal Vref_TM_LFD for LFD is supplied from another voltage node which is not the second pre-amplifier PRE-AMP2.

During the touch mode period TM, the voltage of each of the first node N1 and the second node N2 of the driving transistor DT in the fifth subpixel SP1-9 is changed as described in FIG. 9. However, during the touch mode period TM, the voltage difference V12 between the first node N1 and the second node N2 of the driving transistor DT in the fifth subpixel SP1-9 is identical or similar to the voltage difference V12 between the first node N1 and the second node N2 of the driving transistor DT in the fifth subpixel SP1-9 before or after the touch mode period TM.

Meanwhile, two or more touch electrodes TE1, TE2, etc. included in one touch electrode row may be simultaneously sensed. Accordingly, during the touch mode period TM, the sense transistor SENT in the fifth subpixel SP1-9 may be turned on together with the sense transistor SENT in the first subpixel SP1-1, the pixel electrode PE in the fifth subpixel SP1-9 may be connected to the third reference line RL3, and the third reference line RL3 may be electrically connected to a pre-amplifier (e.g., PRE-AMP2) different from the first pre-amplifier PRE-AMP1, and thus the touch electrodes may be sensed by the pre-amplifier (e.g., PRE-AMP2).

Figure 14:
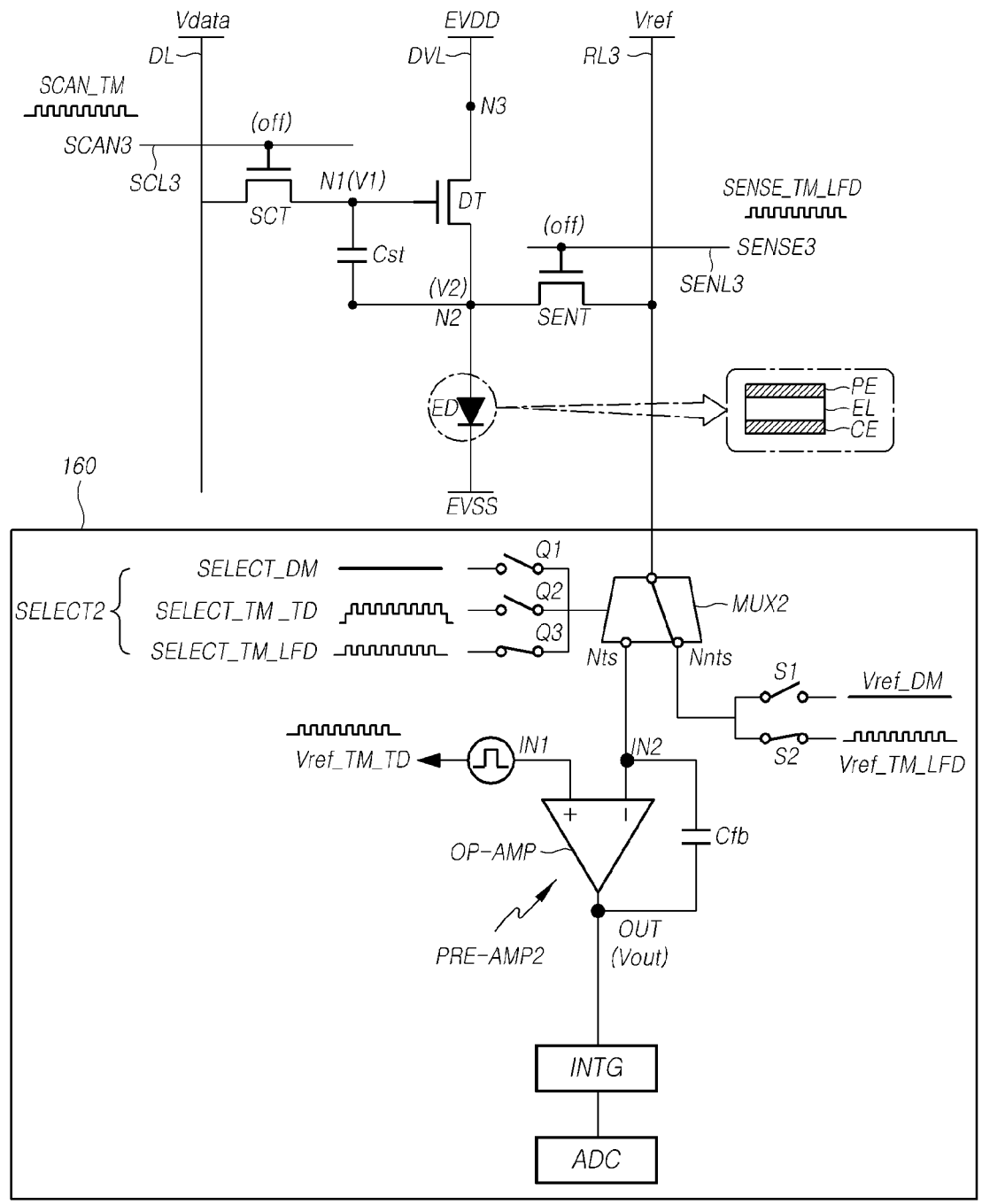
FIG. 14 is yet another diagram illustrating load-free driving during a touch mode period of a touch display device according to exemplary embodiments of the present disclosure.
Figure 15:
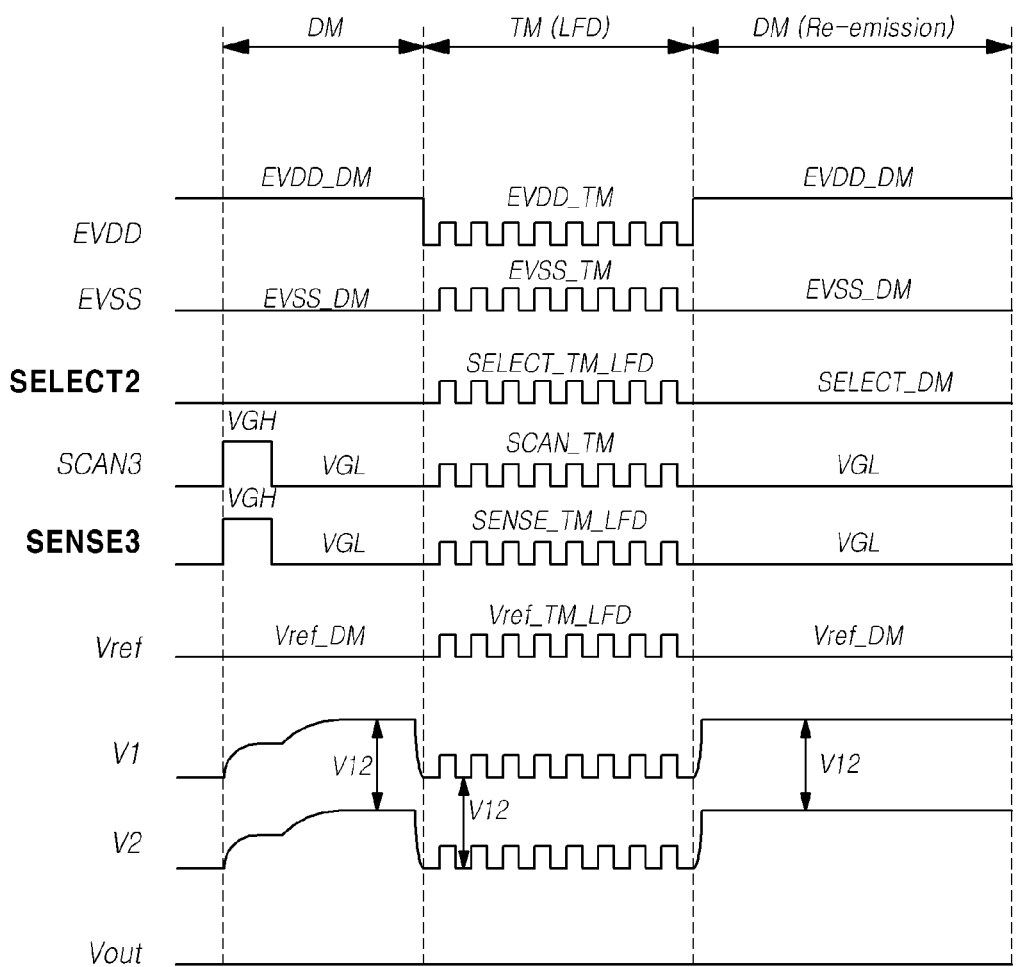
FIG. 15 is yet another timing diagram illustrating load-free driving during a touch mode period of a touch display device according to exemplary embodiments of the present disclosure.

FIG. 14 is yet another diagram illustrating the LFD during the touch mode period TM of the touch display device 100 according to the exemplary embodiments of the present disclosure. FIG. 15 is yet another timing diagram illustrating the LFD during the touch mode period TM of the touch display device 100 according to the exemplary embodiments of the present disclosure.

The driving for the sixth subpixel SP3-9 including one of the pixel electrodes PE disposed in the region of the fourth touch electrode TE4 and the LFD during the touch mode period TM will be described with reference to FIGS. 14 and 15.

Referring to FIGS. 14 and 15, the sixth subpixel SP3-9 among the plurality of subpixels SP may be electrically connected to the third reference line RL3 and electrically connected to the third sense line SENL3 different from the first sense line SENL1.

During the touch mode period TM, the third sense signal SENSE3 in the sense signal SENSE_TM_LFD type for LFD having a turn-off level is supplied to the third sense line SENL3 at a timing when the first sense signal SENSE1 in the sense signal SENSE_TM_TD type for touch driving having a turn-on level is supplied to the first sense line SENL1.

Therefore, when the sense transistor SENT in the first subpixel SP1-1 is turned on, the sense transistor SENT in the sixth subpixel SP3-9 is turned off.

Accordingly, the pixel electrode PE in the sixth subpixel SP3-9 is not connected to the third reference line RL3. The third reference line RL3 is not connected to the second pre-amplifier PRE-AMP2. Further, the third reference line RL3 is not connected to the first pre-amplifier PRE-AMP1.

The voltage level of the driving voltage EVDD_TM for a touch mode and the voltage level of the base voltage EVSS_TM for a touch mode are changed during the touch mode period TM, and thus the voltage of each of the first node N1 and the second node N2 of the driving transistor DT in the sixth subpixel SP3-9 is changed. However, the voltage difference V12 between the first node N1 and the second node N2 of the driving transistor DT in the sixth subpixel SP3-9 is identical or similar to the voltage difference V12 between the first node N1 and the second node N2 of the driving transistor DT in the sixth subpixel SP3-9 before or after the touch mode period TM.

Figure 16:
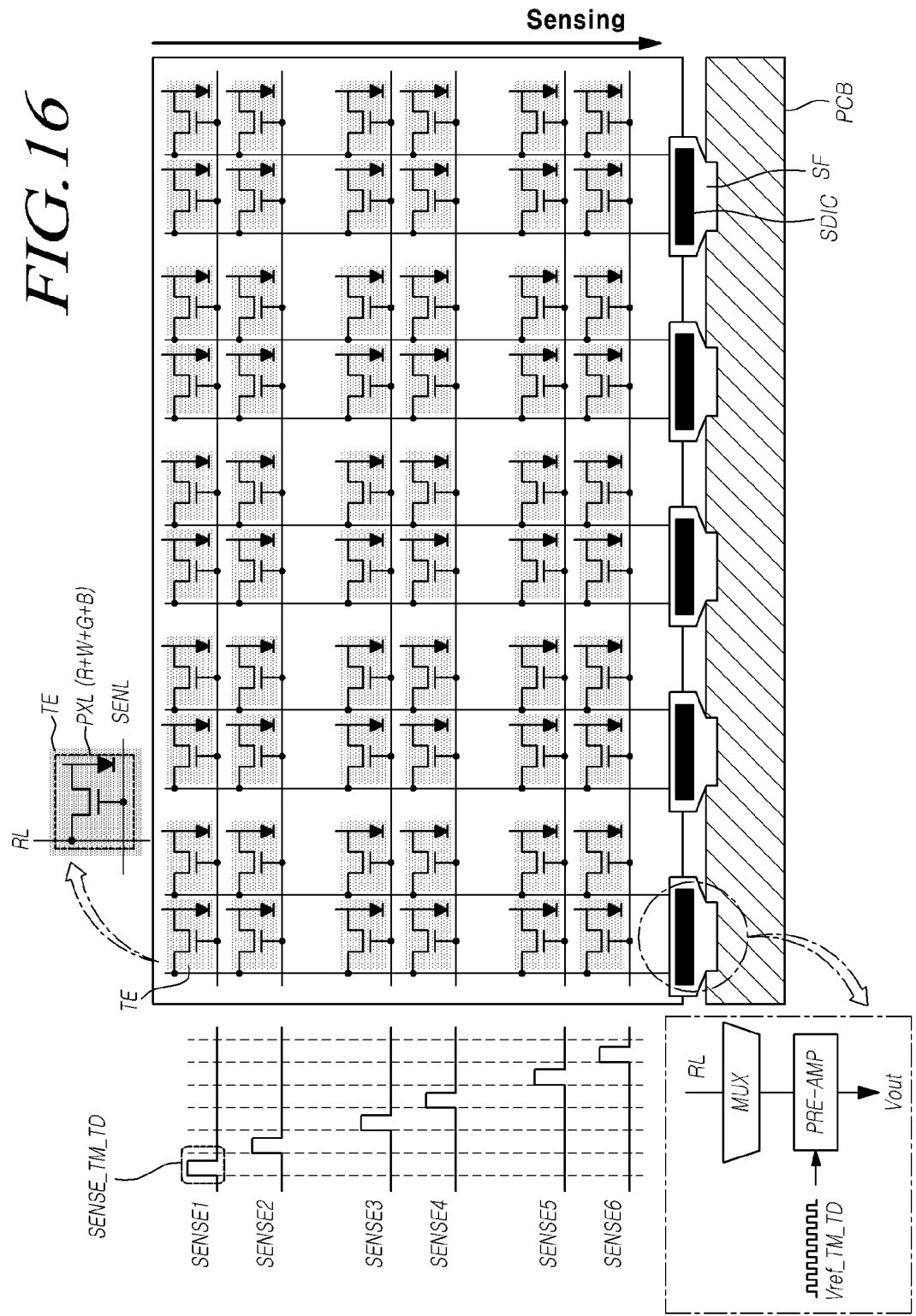
FIG. 16 is a timing diagram illustrating touch driving which is performed on one pixel allocated as one touch electrode in a touch mode of a touch display device according to exemplary embodiments of the present disclosure.
Figure 17:
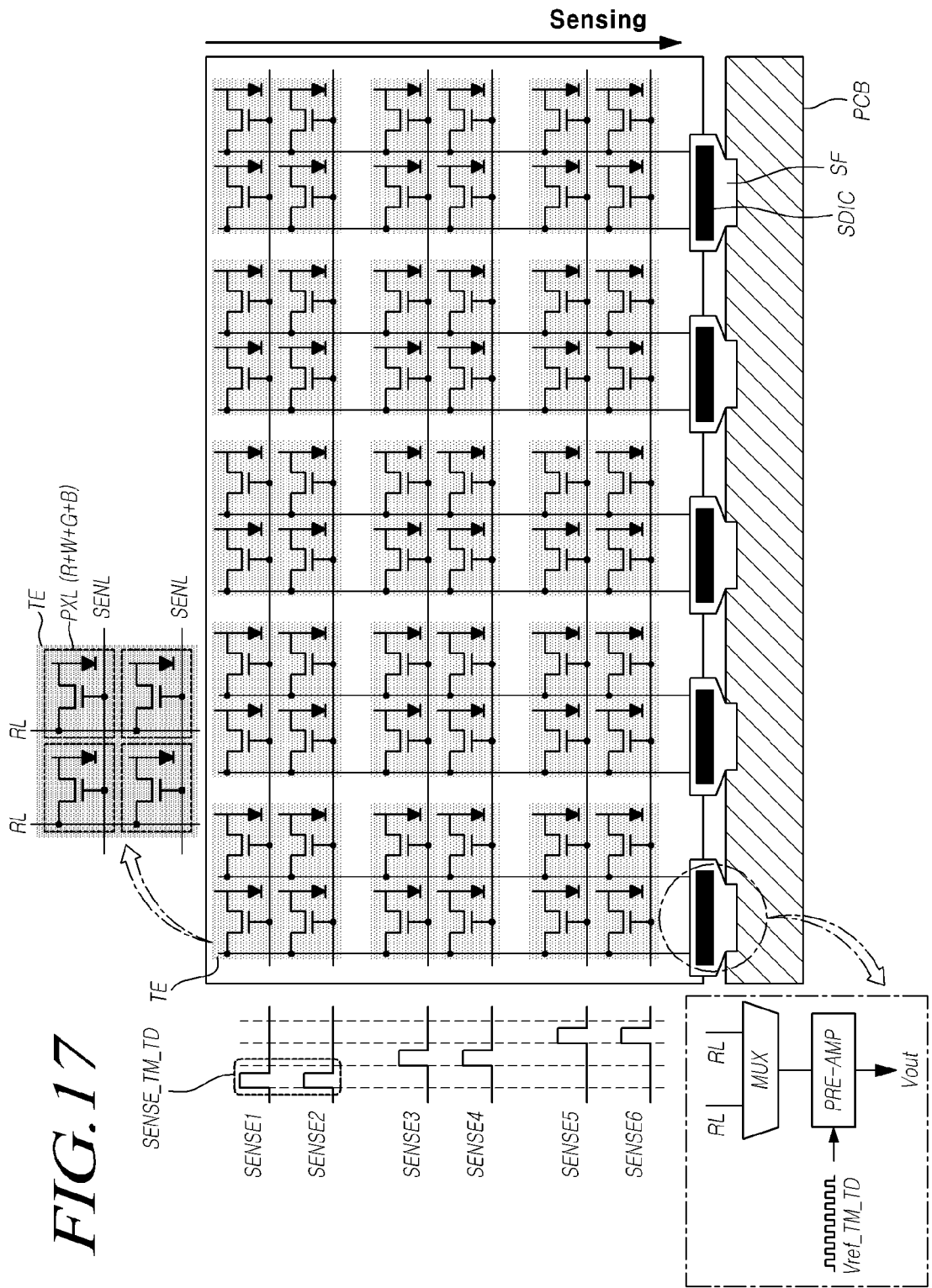
FIG. 17 is a timing diagram illustrating touch driving which is performed on four pixels allocated as one touch electrode in order to increase a size of the touch electrode in a touch mode of a touch display device according to exemplary embodiments of the present disclosure.
Figure 18:
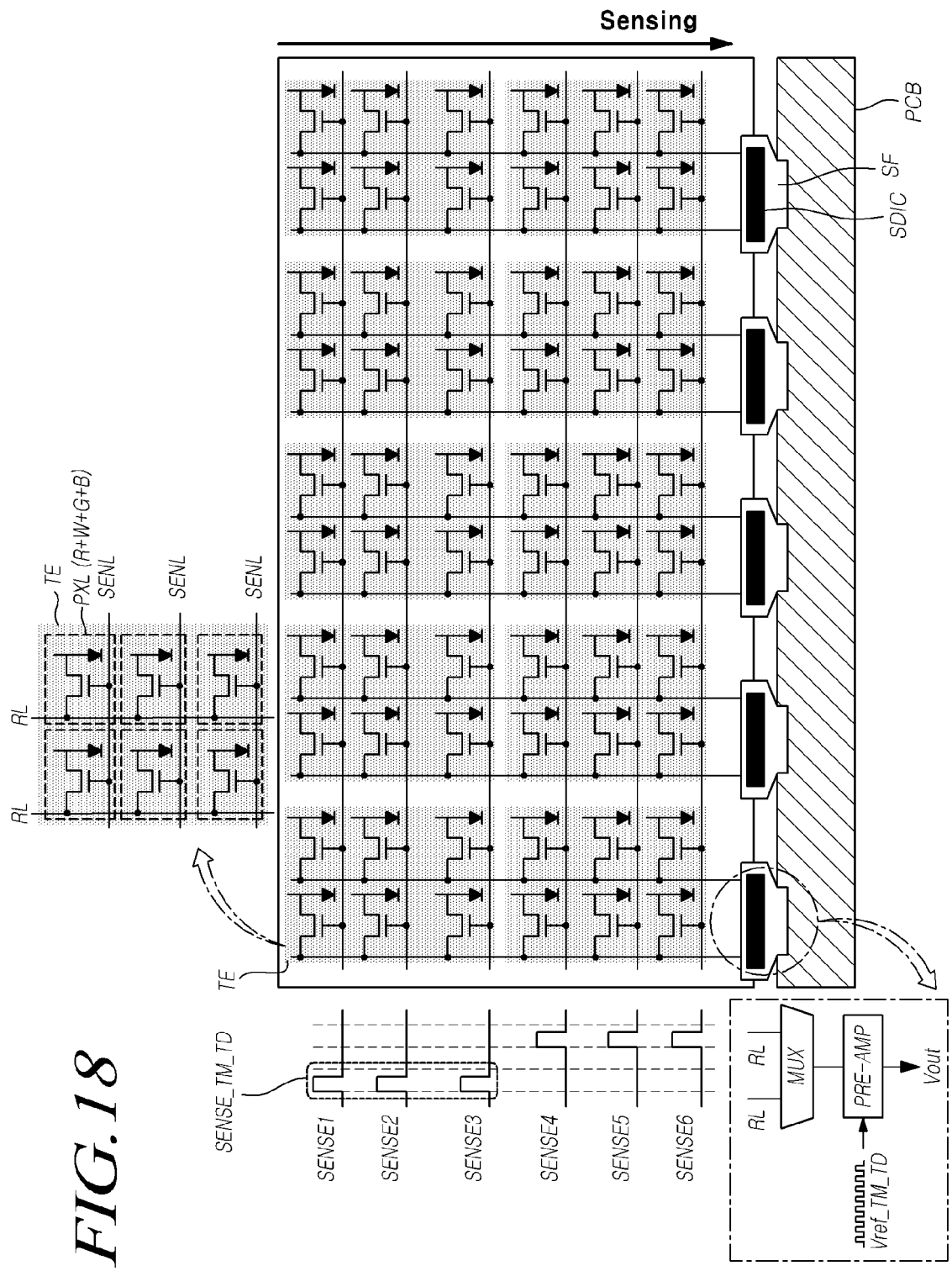
FIG. 18 is a timing diagram illustrating touch driving which is performed on six pixels allocated as one touch electrode in order to increase a size of the touch electrode in a touch mode of a touch display device according to exemplary embodiments of the present disclosure.

FIG. 16 is a timing diagram illustrating touch driving which is performed on one pixel allocated as one touch electrode in a touch mode of the touch display device 100 according to the exemplary embodiments of the present disclosure. FIG. 17 is a timing diagram illustrating touch driving which is performed on four pixels allocated as one touch electrode in order to increase the size of a touch electrode in a touch mode of the touch display device 100 according to the exemplary embodiments of the present disclosure. FIG. 18 is a timing diagram illustrating touch driving which is performed on six pixels allocated as one touch electrode in order to increase the size of a touch electrode in a touch mode of the touch display device 100 according to the exemplary embodiments of the present disclosure.

Referring to FIGS. 16 to 18, the sensing circuit 160 may be implemented by being included in a source driver integrated circuit SDIC. The source driver integrated circuit SDIC may be implemented in a COF type. In this case, the source driver integrated circuit SDIC may be mounted on a source circuit film SF. One end and the other end of the source circuit film SF may be connected to the display panel 110 and the printed circuit board PCB, respectively.

As described above, one or more pixel electrodes PE may constitute one touch electrode TE.

In order to increase the number of pixel electrodes for constituting one touch electrode TE, that is, in order to increase the size of the touch electrode TE, a method of increasing the size of the touch electrode in a row direction and a method of increasing the size of the touch electrode in a column direction are used.

When the number of reference lines RL which are connectable to one pre-amplifier PRE-AMP increases, the number of pixel electrodes PE in the same driving state increases in the row direction so that the size of the touch electrode TE increases in the row direction.

When the number of sense lines SENL through which the sense signals SENSE_TM_TD for touch driving are simultaneously supplied at the same timing increases, the number of pixel electrodes PE in the same driving state increases in the column direction so that the size of the touch electrode TE increases in the column direction.

Referring to FIG. 16, one pixel includes four subpixels (R, W, G, and B) which are adjacent to each other in the row direction. When the four subpixels (R, W, G, and B) share one reference line RL, one touch electrode TE may include four pixel electrodes PE which are disposed adjacent to each other in the row direction in one pixel.

In this case, the reference line RL is connectable to one pre-amplifier PRE-AMP through a multiplexer MUX. A reference signal Vref_TM_TD for touch driving is simultaneously applied to the four pixel electrodes PE in one pixel, which constitute one touch electrode TE, through one pre-amplifier PRE-AMP.

Further, first to sixth sense signals SENSE1 to SENSE6 in a sense signal SENSE_TM_TD type for touch driving are sequentially supplied to first to sixth sense lines SENL1 to SENL6.

Referring to FIG. 17, one pixel includes four subpixels (R, W, G, and B) which are adjacent to each other in the row direction. When the four subpixels (R, W, G, and B) share one reference line RL, one touch electrode TE may include 16 pixel electrodes PE of two rows and two columns in four pixels.

In this case, two reference lines RL are connectable to one pre-amplifier PRE-AMP through a multiplexer MUX. A reference signal Vref_TM_TD for touch driving is simultaneously applied to the 16 pixel electrodes PE in the four pixels, which constitute one touch electrode TE, through one pre-amplifier PRE-AMP.

Further, first and second sense signals SENSE1 and SENSE2 in a sense signal SENSE_TM_TD type for touch driving are supplied to first and second sense lines SENL1 and SENL2 at the same timing, respectively. Next, third and fourth sense signals SENSE3 and SENSE4 in the sense signal SENSE_TM_TD type for touch driving are supplied to third and fourth sense lines SENL3 and SENL4 at the same timing, respectively. Next, fifth and sixth sense signals SENSE5 and SENSE6 in the sense signal SENSE_TM_TD type for touch driving are supplied to fifth and sixth sense lines SENL5 and SENL6 at the same timing, respectively.

Referring to FIG. 18, one pixel includes four subpixels (R, W, G, and B) which are adjacent to each other in the row direction. When the four subpixels (R, W, G, and B) share one reference line RL, one touch electrode TE may include 24 pixel electrodes PE of three rows and two columns in six pixels.

In this case, two reference lines RL are connectable to one pre-amplifier PRE-AMP through a multiplexer MUX. A reference signal Vref_TM_TD for touch driving is simultaneously applied to the 24 pixel electrodes PE in the six pixels, which constitute one touch electrode TE, through one pre-amplifier PRE-AMP.

Further, first to third sense signals SENSE1, SENSE2, and SENSE3 in a sense signal SENSE_TM_TD type for touch driving are supplied to first to third sense lines SENL1, SENL2, and SENL3 at the same timing, respectively. Next, fourth to sixth sense signals SENSE4, SENSE5, and SENSE6 in the sense signal SENSE_TM_TD type for touch driving are supplied to fourth to sixth sense lines SENL4, SENL5, and SENL6 at the same timing, respectively.

Using the methods of increasing the size of the touch electrode described above with reference to FIGS. 16 to 18, the touch display device 100 may fixedly form the increased size of the touch electrode. Depending on a situation, the touch display device 100 may adaptively change the size of the touch electrode by controlling an output of the sense signal SENSE or controlling the number of reference lines RL connected to the pre-amplifier PRE-AMP through the operation control of the multiplexer MUX.

Figure 19A:
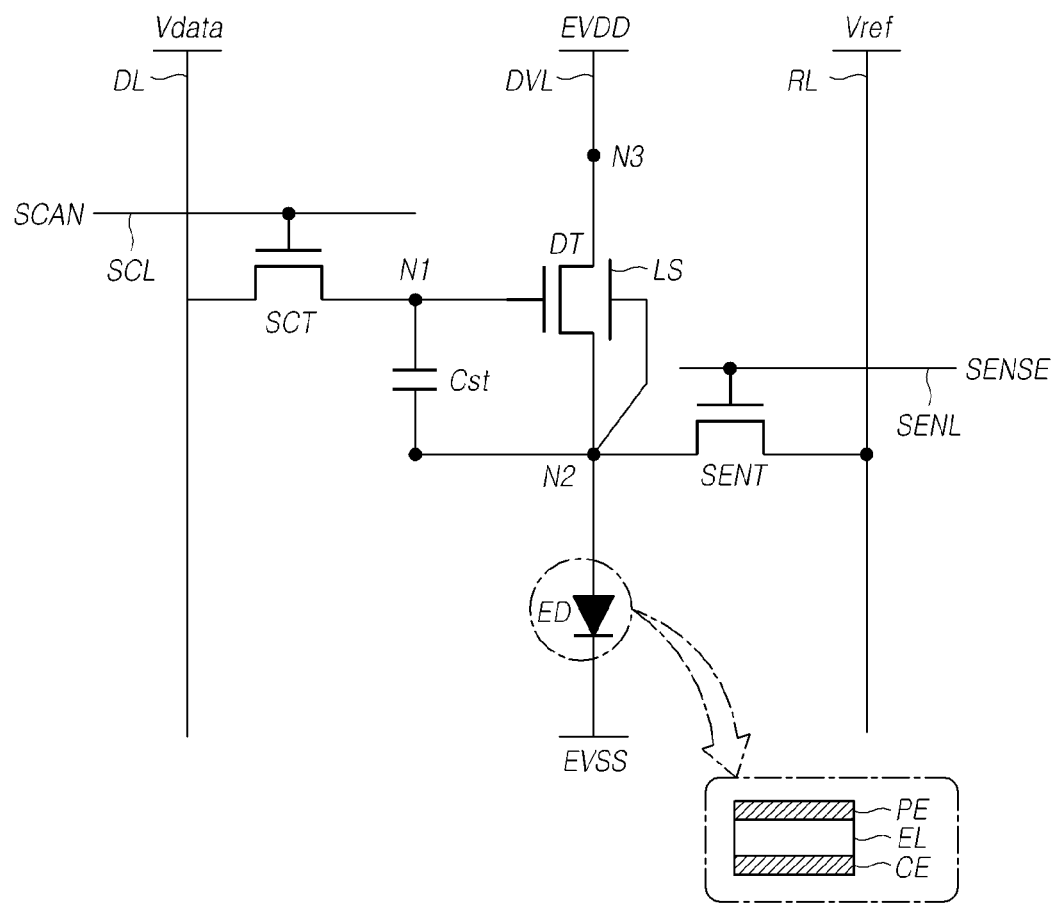
FIGS. 19A and 19B are diagrams illustrating an internal structure of a subpixel to increase a size of a touch electrode in a touch display device according to exemplary embodiments of the present disclosure.
Figure 19B:
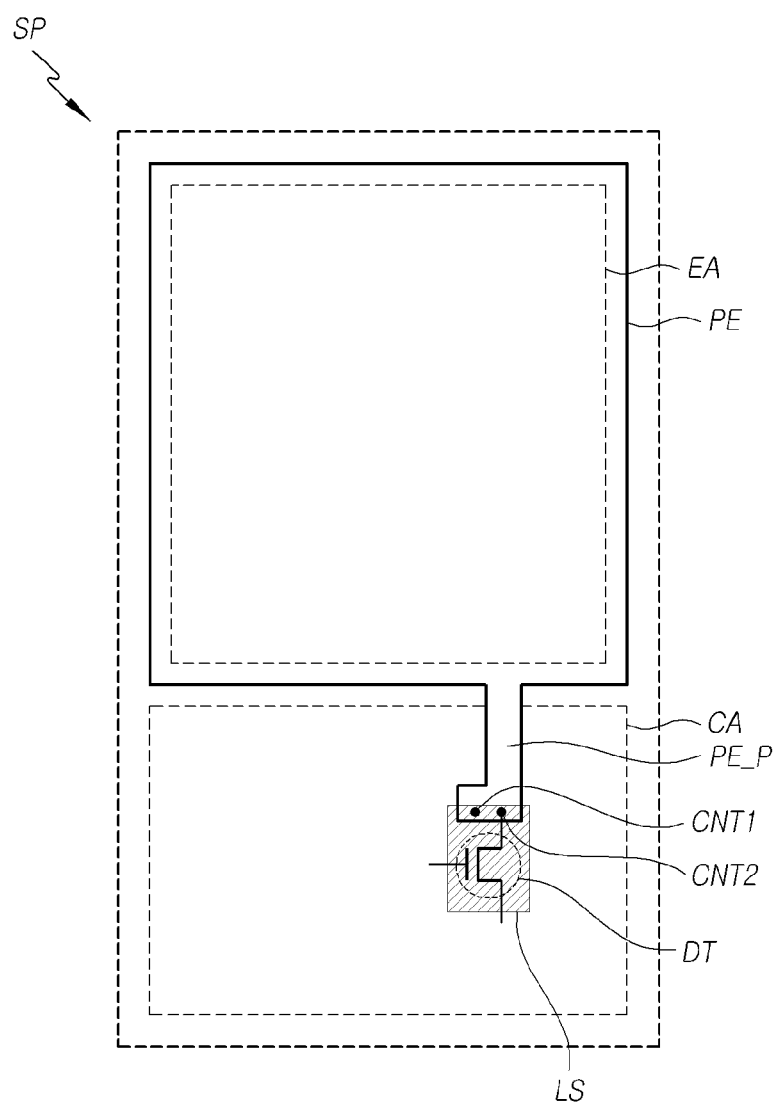

FIGS. 19A and 19B are diagrams illustrating an internal structure of a subpixel SP to increase the size of the touch electrode in the touch display device 100 according to the exemplary embodiments of the present disclosure.

Referring to FIG. 19A, the touch display device 100 may further include a plurality of light shields LS which are respectively disposed in regions of the plurality of subpixels SP, overlap a channel of the driving transistor DT, and are electrically connected to the pixel electrode PE.

Referring to FIG. 19B, one subpixel SP includes a circuit region CA, in which a driving transistor DT, a scan transistor SCT, a sense transistor SENT, and a storage capacitor Cst are disposed as illustrated in FIG. 19A, and a light-emitting region EA in which a pixel electrode PE and a light-emitting layer EL are disposed and through which light is emitted. However, in FIG. 19B, for convenience of description, except for the driving transistor DT, the scan transistor SCT, the sense transistor SENT, and the storage capacitor Cst are omitted.

Referring to FIG. 19B, the pixel electrode PE includes a protrusion PE_P protruding from a portion thereof disposed in the light-emitting region EA to the circuit region CA. The light shield LS may be disposed in the circuit region CA. The light shield LS may fully overlap the driving transistor DT or overlap the channel of the driving transistor DT.

Referring to FIG. 19B, the protrusion PE_P of the pixel electrode PE may be electrically connected to the light shield LS disposed in the circuit region CA through a first contact hole CNT1. The protrusion PE_P of the pixel electrode PE may be electrically connected to a second node N2 of the driving transistor DT disposed in the circuit region CA through a second contact hole CNT2.

The first contact hole CNT1 through which the protrusion PE_P of the pixel electrode PE and the light shield LS are connected to each other and the second contact hole CNT2 through which the protrusion PE_P of the pixel electrode PE and the second node N2 of the driving transistor DT are connected to each other may be different from the contact holes illustrated in FIG. 19B or may be the same as the contact holes.

Since the light shield LS is electrically connected to the pixel electrode PE, a reference signal Vref_TM_TD for touch driving is applied to the light shield LS as well as the pixel electrode PE during the touch mode period TM. Accordingly, an effective area of an electrode serving as a touch electrode, that is, an area of an electrode to which a signal is applied, is increased by an area of the light shield LS. As the effective area of the electrode increases, the magnitude of capacitance required for touch sensing increases, thereby improving touch sensitivity.

Figure 20:
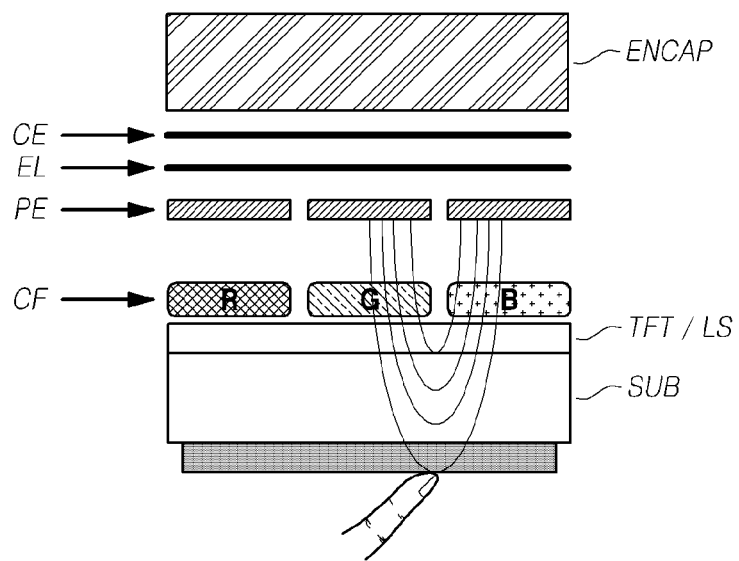
FIG. 20 is a simplified cross-sectional view of a touch display device according to exemplary embodiments of the present disclosure.

FIG. 20 is a simplified cross-sectional view of the touch display device 100 according to the exemplary embodiments of the present disclosure.

Referring to FIG. 20, the touch display device 100 according to the exemplary embodiments of the present disclosure may have a bottom emission structure.

The display panel 110 of the touch display device 100 according to the exemplary embodiments of the present disclosure may further include a substrate SUB, a light-emitting layer EL disposed on a pixel electrode PE on the substrate SUB, a common electrode CE disposed on the light-emitting layer EL, and an encapsulation layer ENCAP disposed on the common electrode CE.

The common electrode CE may be disposed on an entirety of a display region of the display panel 110 on which an image is displayed.

A metal layer disposed on the entirety of the display region is not present between the plurality of pixel electrodes PE serving as the touch electrodes and the substrate SUB. The common electrode CE corresponding to the metal layer disposed on the entirety of the display region is present between the plurality of pixel electrodes PE serving as the touch electrodes and the encapsulation layer ENCAP.

Therefore, it is difficult to detect the occurrence of a touch on a top of the encapsulation layer ENCAP and it is easy to detect the occurrence of a touch on a bottom of the substrate SUB.

When it is assumed that a touch surface which is touched by a user is the same as a screen on which an image is displayed or is disposed to be coplanar with the screen, the touch display device 100 according to the exemplary embodiments of the present disclosure is implemented with a bottom emission structure. When the touch display device 100 is implemented with the bottom emission structure, color (R, G, B, etc.) filters may be disposed between the pixel electrode PE and the substrate SUB.

The touch display device 100 according to the exemplary embodiments of the present disclosure described above may include a display panel 110 including a plurality of subpixels SP, wherein each of the plurality of subpixels SP may include a light-emitting device including a pixel electrode PE and a common electrode CE, a driving transistor DT configured to drive the light-emitting device, and a storage capacitor Cst including a first plate which is electrically connected to a first node N1 of the driving transistor DT and a second plate which is electrically connected to the pixel electrode PE, and the touch display device 100 may include a sensing circuit 160 configured to detect a signal using at least one first pixel electrode PE included in at least one first subpixel SP1-1 among the plurality of subpixels SP during a touch mode period TM.

During a display mode period DM, the first plate and the second plate in the storage capacitor Cst in the first subpixel SP1-1 have a first voltage difference.

During the touch mode period TM, each of the first plate and the second plate in the storage capacitor Cst in the first subpixel SP1-1 may have a voltage state in which a voltage level is changed.

During the touch mode period TM, the first plate and the second plate in the storage capacitor Cst in the first subpixel SP1-1 may maintain the first voltage difference.

A driving voltage EVDD applied to the driving transistor DT during the display mode period DM is a driving voltage EVDD_DM for a display mode having a constant voltage level.

A driving voltage EVDD applied to the driving transistor DT during the touch mode period TM is a driving voltage EVDD_TM for a touch mode of which a voltage level is variable.

A voltage level change, a frequency, a phase, and an amplitude of the driving voltage EVDD_TM for a touch mode may correspond to a voltage level change, a frequency, a phase, and an amplitude of each of the first plate and the second plate of the storage capacitor Cst.

During the touch mode period TM, the light-emitting device ED in the first subpixel SP1-1 may be in a non-light-emitting state.

The touch display device 100 according to the exemplary embodiments of the present disclosure may include a display panel 110 in which a plurality of data lines DL, a plurality of scan lines SCL, a plurality of sense lines SENL, and a plurality of reference lines RL are disposed and which includes a plurality of subpixels SP, and a sensing circuit 160 configured to output a reference signal Vref_TM_TD of which a voltage level is variable.

Each of the plurality of subpixels SP may include a light-emitting device ED including a pixel electrode PE, a light-emitting layer EL, and a common electrode CE, a driving transistor DT configured to drive the light-emitting device ED, a scan transistor SCT which is controlled by a scan signal SCAN and disposed between and connected to a first node N1 of the driving transistor DT and the data line DL, a sense transistor SENT which is controlled by a sense signal SENSE and disposed between and connected to a second node N2 of the driving transistor DT and the reference line RL, and a storage capacitor Cst disposed between and connected to the first node N1 and the second node N2 of the driving transistor DT.

Referring to FIG. 7, during a touch mode period TM, a sense signal SENSE_TM_TD of which a voltage level is variable may be simultaneously supplied to two or more sense lines SENL1 and SENL2 among the plurality of sense lines SENL. A reference signal Vref_TM_TD of which a voltage level is variable may be supplied to one or more reference lines RL1 among the plurality of reference lines RL and applied to the pixel electrode PE which is electrically connected to the second node N2 of the driving transistor DT in two or more subpixels SP1-1 and SP2-1 among the plurality of subpixels SP1.

Figure 21:
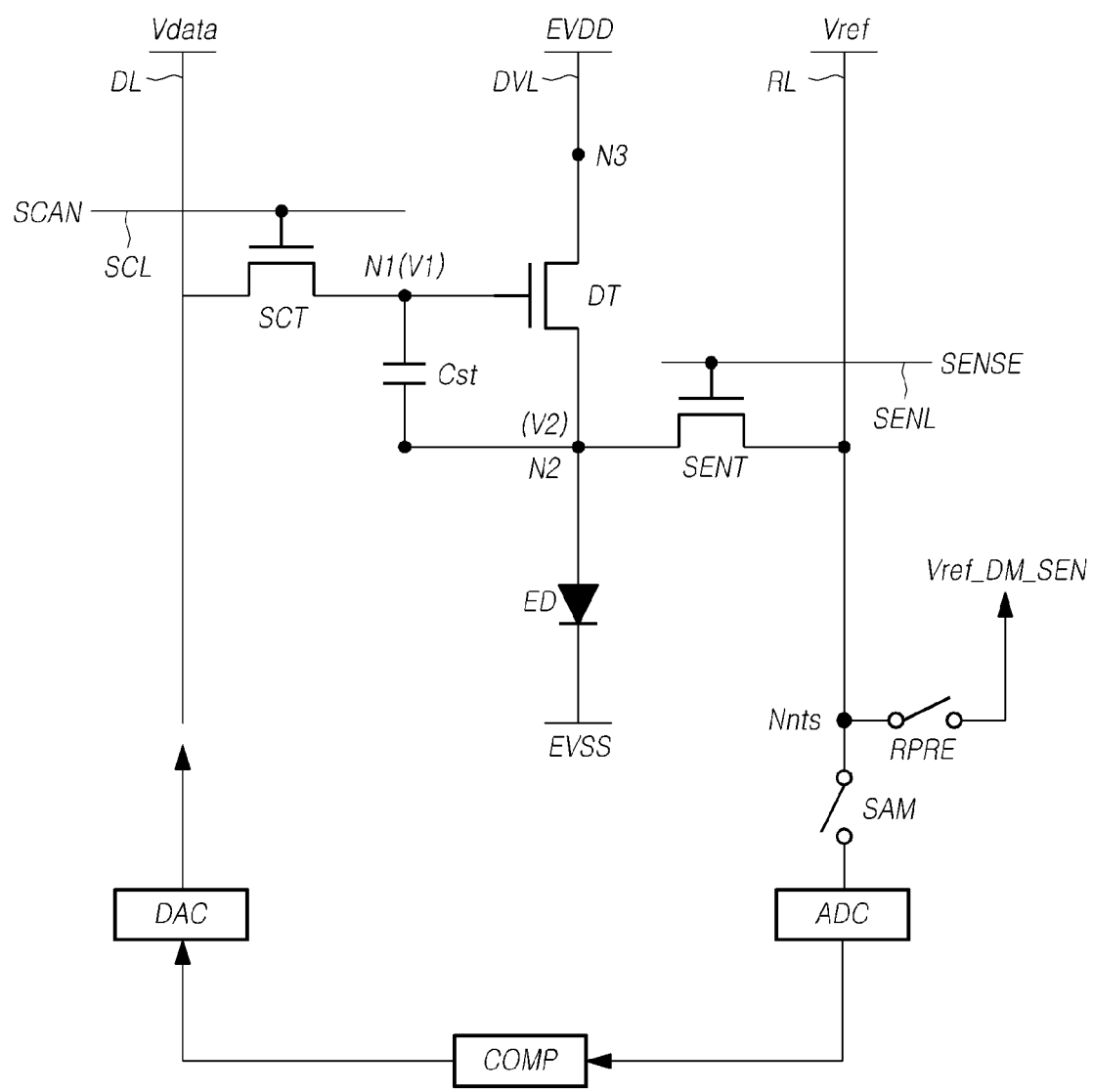
FIG. 21 is a diagram illustrating a circuit for sensing a characteristic value of a display element of a touch display device according to exemplary embodiments of the present disclosure.

FIG. 21 is a diagram illustrating a circuit for sensing a characteristic value of a display element of the touch display device 100 according to the exemplary embodiments of the present disclosure.

FIG. 21 is a diagram illustrating a display sensing and compensation circuit for sensing a characteristic value of a display element in each of subpixels SP in the touch display device 100 according to the exemplary embodiments of the present disclosure.

The display element in each subpixel SP may include a driving transistor DT or a light-emitting device ED. Characteristic values of the display element in each subpixel SP may include a threshold voltage and mobility of the driving transistor DT or may include a threshold voltage of the light-emitting device ED.

Referring to FIG. 21, the display sensing and compensation circuit includes, in addition to the subpixel structure described above, an initialization switch RPRE configured to control whether or not to supply a reference signal Vref_DM_SEN for display sensing driving to a reference line RL, an analog-to-digital converter ADC configured to sense a voltage of the reference line RL, convert the sensed voltage into a digital sensing value, and output the converted value, a sampling switch SAM configured to control whether or not to connect the reference line RL and the analog-to-digital converter ADC, and a compensation unit COMP configured to sense characteristic values (e.g., a threshold voltage, mobility, etc.) of a display element, such as a driving transistor DT or a light-emitting device ED in a corresponding subpixel SP, on the basis of the sensing value output from the analog-to-digital converter ADC, calculate a compensation value for compensating a deviation from a characteristic value of a display element in another subpixel SP, and change image data on the basis of the calculated compensation value.

The initialization switch RPRE, the analog-to-digital converter ADC, and the sampling switch SAM of FIG. 21 may be included in a source driver integrated circuit SDIC.

A point at which the initialization switch RPRE and the reference line RL are connected may be the non-touch sensing node Nnts illustrated in FIG. 5.

A reference signal Vref_DM_SEN for display sensing driving may be the same as or different from a reference signal Vref_DM for a display mode.

When the reference signal Vref_DM_SEN for display sensing driving is the same as the reference signal Vref_DM for a display mode, the initialization switch RPRE may be the first reference switch S1 illustrated in FIG. 5.

The analog-to-digital converter ADC of FIG. 21 may be different from the analog-to-digital converter ADC illustrated in FIG. 5. That is, the analog-to-digital converter ADC for display sensing and the analog-to-digital converter ADC for touch sensing can be provided additionally.

The analog-to-digital converter ADC of FIG. 21 may be the same as the analog-to-digital converter ADC illustrated in FIG. 5. That is, the analog-to-digital converter ADC for touch sensing can be used as the analog-to-digital converter ADC for display sensing.

The image data changed in the compensation unit COMP is supplied to the corresponding subpixel SP through a digital-to-analog converter DAC. Accordingly, a deviation of the characteristic value of the display element can be compensated for.

Figure 22:
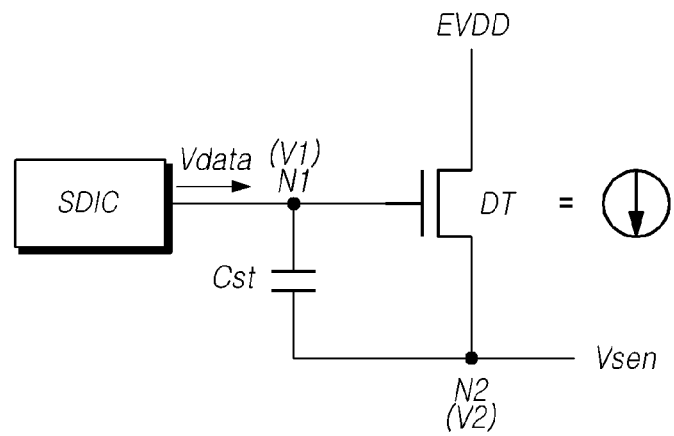
FIG. 22 is a diagram for describing mobility sensing of a driving transistor which is a display element of a touch display device according to exemplary embodiments of the present disclosure.
Figure 22:
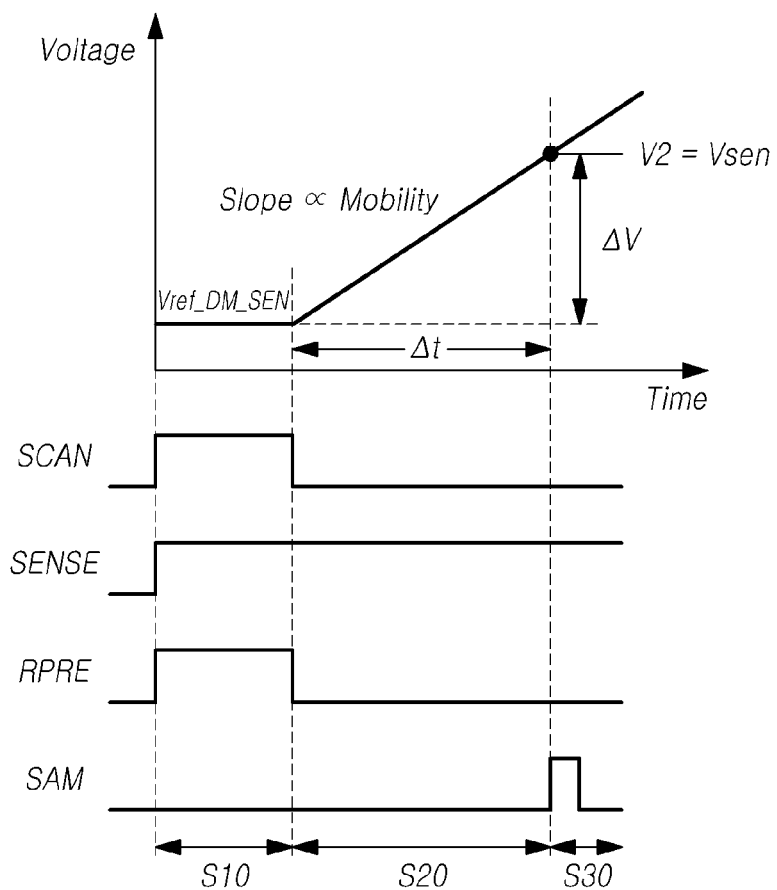

FIG. 22 is a diagram for describing mobility sensing of a driving transistor DT which is a display element of the touch display device 100 according to the exemplary embodiments of the present disclosure.

Referring to FIG. 22, the driving for sensing the mobility of the driving transistor DT may include an initialization period S10, a tracking period S20, and a sampling period S30.

In the initialization period S10, a scan transistor SCT is turned on by a scan signal SCAN having a turn-on level, and a sense transistor SENT is turned on by a sense signal SENSE having a turn-on level. Next, the initialization switch RPRE is turned on.

Accordingly, in the initialization period S10, a data voltage Vdata (a data voltage for display sensing driving) supplied to a data line DL is applied to a first node N1 of the driving transistor DT through the scan transistor SCT that is turned on.

In the initialization period S10, a reference signal Vref_DM_SEN for display sensing driving, which is supplied to a reference line RL by an initialization switch RPRE that is turned on, is applied to a second node N2 of the driving transistor DT through the sense transistor SENT that is turned on.

In the tracking period S20, by the scan signal SCAN having a turn-off level, the scan transistor SCT is turned off and the initialization switch RPRE is turned off. Accordingly, the first node N1 and the second node N2 of the driving transistor DT are floated.

The second node N2 of the driving transistor DT is floated, and thus a voltage V2 of the second node N2 of the driving transistor DT is increased.

The reference line RL has a voltage corresponding to the voltage V2 of the second node N2 of the driving transistor DT due to the sense transistor SENT that is turned on.

In the initialization period S10 and the tracking period S20, the reference line RL has a voltage corresponding to the voltage V2 of the second node N2 of the driving transistor DT due to the sense transistor SENT that is turned on.

After the voltage V2 of the second node N2 of the driving transistor DT is increased during a predetermined time Δt, a sampling switch SAM is turned on. Accordingly, the sampling period S30 is performed.

In this case, the voltage V2 of the second node N2 of the driving transistor DT which is increased during the predetermined time Δt is a value obtained by adding a voltage increase amount ΔV to the voltage of the reference signal Vref_DM_SEN for display sensing driving before the increasing.

The sampling period S30, when the sampling switch SAM is turned on, the analog-to-digital converter ADC is electrically connected to the reference line RL, senses the voltage of the reference line RL, and converts a sensed voltage Vsen into a digital sensing value.

The sensed voltage Vsen is a value obtained by adding the voltage of the reference signal Vref_DM_SEN for display sensing driving, which is already known as a voltage before the increasing, to the voltage increase amount ΔV.

Therefore, the compensation unit COMP may calculate the voltage increase amount ΔV on the basis of the digital sensing value output from the analog-to-digital converter ADC and the reference signal Vref_DM_SEN for display sensing driving which is already known.

The compensation unit COMP may calculate the mobility of the driving transistor DT in the corresponding subpixel SP on the basis of the predetermined time Δt and the calculated voltage increase amount ΔV.

The compensation unit COMP may calculate a voltage-increase slope by dividing the calculated voltage increase amount ΔV by the predetermined time Δt.

By using a characteristic in which the voltage-increase slope is proportional to the mobility of the driving transistor DT, the compensation unit COMP may calculate the mobility of the driving transistor DT from the calculated voltage-increase slope.

Figure 23:
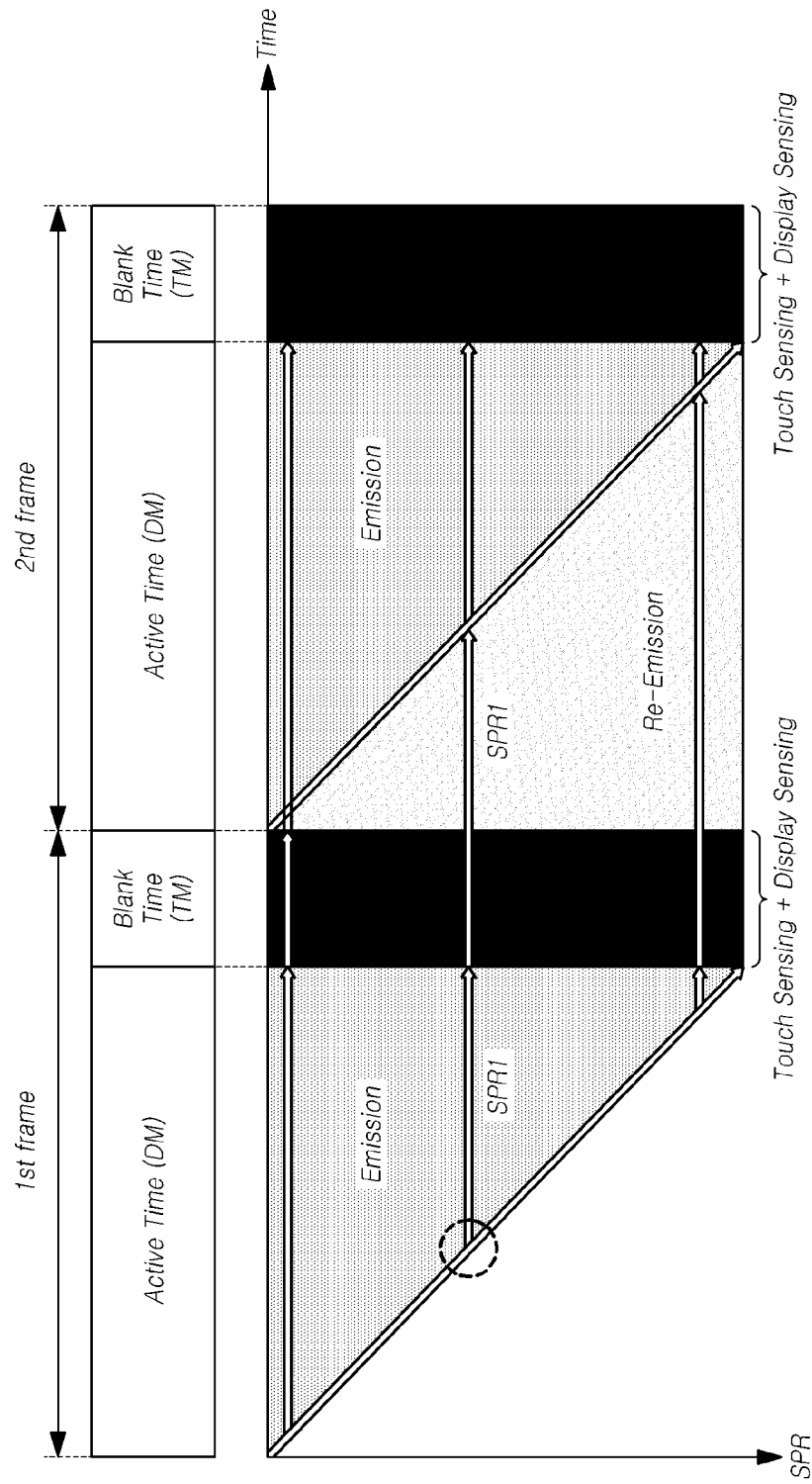
FIG. 23 is a diagram for describing a touch mode period and a mobility sensing period of a touch display device according to exemplary embodiments of the present disclosure.

FIG. 23 is a diagram for describing a touch mode period TM and a mobility sensing period of the touch display device 100 according to the exemplary embodiments of the present disclosure.

Referring to FIG. 23, a blank time may include both of the touch mode period TM and the mobility sensing period. That is, both of the touch driving (the LFD) and the mobility sensing driving (the display sensing driving) may be performed during the blank time.

Figure 24:
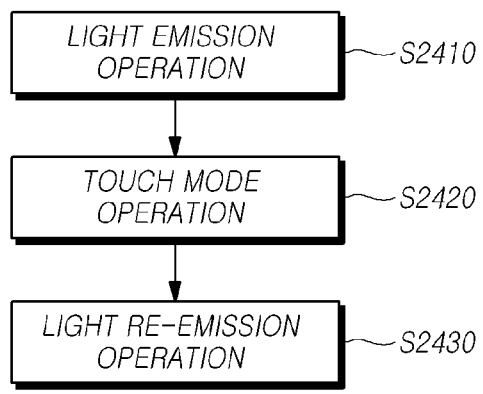
FIG. 24 is a flowchart for describing a driving method of a touch display device according to exemplary embodiments of the present disclosure.

FIG. 24 is a flowchart for describing a driving method of the touch display device 100 according to the exemplary embodiments of the present disclosure.

Referring to FIG. 24, the driving method of the touch display device 100 which includes a common electrode CE, a plurality of data lines DL, a plurality of scan lines SCL, and a plurality of subpixels SP, wherein each of the plurality of subpixels SP includes a pixel electrode PE, a driving transistor DT, and a storage capacitor Cst, the driving method may include a touch mode operation S2420 of applying a reference signal Vref_TM_TD for touch driving of which a voltage level is changed to a first pixel electrode PE included in a first subpixel SP1-1 among the plurality of subpixels SP during a touch mode period TM and sensing the first pixel electrode PE included in the first subpixel SP1-1 during the touch mode period TM.

During the touch mode period TM, the driving transistor DT in the first subpixel SP1-1 is in a turned-off state.

The driving method of the touch display device 100 may further include a light emission operation S2410 of emitting, by a light-emitting device in the first subpixel SP1-1, light due to a voltage difference between two nodes of the storage capacitor Cst in the first subpixel SP1-1 before the touch mode operation S2420.

The driving method of the touch display device 100 may further include a light re-emission operation S2430 of returning a voltage difference between the two nodes of the storage capacitor Cst in the first subpixel SP1-1 to the voltage difference between the two nodes of the storage capacitor Cst in the first subpixel SP1-1 in the light emission operation S2410 and emitting, by the light-emitting device ED in the first subpixel SP1-1, light again after the touch mode operation S2420.

A voltage state and a voltage value of each of the two nodes of the storage capacitor Cst in the first subpixel SP1-1 in the touch mode operation S2420 may be different from a voltage state and a voltage value of each of the two nodes of the storage capacitor Cst in the first subpixel SP1-1 in the light emission operation S2410 or the light re-emission operation S2430.

According to the exemplary embodiments of the present disclosure described above, a touch is sensed by only utilizing electrodes and a line structure for display, and thus there is no need to provide a touch panel additionally or form additional touch electrodes in a display panel. Accordingly, the size (thickness) of the touch display device 100 can be reduced and a manufacturing process of the touch display device 100 can be simplified.

According to the exemplary embodiments of the present disclosure, a touch is sensed by utilizing pixel electrodes for display as touch electrodes, and thus a driving process for touch sensing and a signal detection process can be facilitated.

According to the exemplary embodiments of the present disclosure, when pixel electrodes PE for display are used as touch electrodes TE and touch driving for touch sensing is performed thereon, electrodes or lines in the vicinity of the pixel electrodes PE serving as the touch electrodes can be driven in a similar manner to the touch driving, and thus formation of unnecessary parasitic capacitance can be prevented and touch sensitivity can be improved.

According to the exemplary embodiments of the present disclosure, the size of the touch electrode TE can be increased by controlling an output of sense signals SENSE which are a type of gate signal. Accordingly, the number of channels of the sensing circuit 160 can be reduced.

According to the exemplary embodiments of the present disclosure, the size of the touch electrode TE including one or more pixel electrodes PE can be changed. Accordingly, it is possible to provide touch sensing suitable for the situation.

The above description has been presented to enable any person skilled in the art to make and use the technical idea of the present disclosure and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising: a display panel including a plurality of data lines, a plurality of scan lines, a plurality of sense lines, a plurality of reference lines, and a plurality of subpixels, wherein each of the plurality of subpixels includes a pixel electrode, a driving transistor, a sense transistor, and a storage capacitor; and a sensing circuit, which is electrically connected to a first pixel electrode included in a first subpixel among the plurality of subpixels, and a second pixel electrode included in a second subpixel among the plurality of subpixels, applies a reference signal for touch driving of which a voltage level is variable to the first pixel electrode and the second pixel electrode, and senses a capacitance between the first pixel electrode and a touch object, and a capacitance between the second pixel electrode and the touch object, during a touch mode period, wherein the first subpixel includes a first sense transistor, a first node of the first sense transistor is electrically connected to the first pixel electrode, a second node of the first sense transistor is electrically connected to a first sense line among the plurality of sense lines, and a third node of the first sense transistor is electrically connected to a first reference line among the plurality of reference lines, wherein the second subpixel includes a second sense transistor, a first node of the second sense transistor is electrically connected to the second pixel electrode, a second node of the second sense transistor is electrically connected to a second sense line among the plurality of sense lines, and a third node of the second sense transistor is electrically connected to the first reference line, wherein the reference signal for touch driving supplied to the first reference line is applied to the first pixel electrode through the first sense transistor in the first subpixel and the second pixel electrode through the second sense transistor in the second subpixel, and wherein during the touch mode period, a second sense signal in a sense signal type for touch driving having a turn-on level is supplied to the second sense line at a timing when a first sense signal in the sense signal type for touch driving having a turn-on level is supplied to the first sense line.

2. The touch display device according to claim 1, wherein, during the touch mode period, the driving transistor in the first subpixel is in a turned-off state and the driving transistor in the second subpixel is in a turned-off state.

3. The touch display device according to claim 1, wherein:
a voltage state and a voltage value of each of two nodes of the storage capacitor in the first subpixel during the touch mode period are changed in comparison to the voltage state and the voltage value before the touch mode period and are different from the voltage state and the voltage value after the touch mode period; and
a voltage difference between the two nodes of the storage capacitor in the first subpixel during the touch mode period corresponds to a voltage difference between the two nodes of the storage capacitor in the first subpixel before or after the touch mode period.

4. The touch display device according to claim 1, wherein:
each of the plurality of subpixels further includes a scan transistor;
the driving transistor in the first subpixel includes a first node, a second node, and a third node, wherein the second node of the driving transistor in the first subpixel is electrically connected to the first pixel electrode and the third node of the driving transistor is electrically connected to a driving line to which a driving voltage is applied;
a gate node of the scan transistor in the first subpixel is electrically connected to a first scan line among the plurality of scan lines, a drain node or a source node of the scan transistor in the first subpixel is electrically connected to a first data line among the plurality of data lines, and the source node or the drain node of the scan transistor in the first subpixel is electrically connected to the first node of the driving transistor in the first subpixel;
the storage capacitor in the first subpixel is disposed between and electrically connected to the first node and the second node of the driving transistor in the first subpixel;
the driving voltage supplied to the driving line during a display mode period different from the touch mode period is a driving voltage for a display mode having a constant voltage level; and
the driving voltage supplied to the driving line during the touch mode period is a driving voltage for a touch mode of which a voltage level is variable, and a frequency, a phase, and an amplitude of the driving voltage for a touch mode correspond to those of the reference signal for touch driving.

5. The touch display device according to claim 4, wherein the voltage level of the driving voltage for a touch mode is variable within a range in which the driving transistor in the first subpixel is turned off.

6. The touch display device according to claim 4, wherein a voltage difference between the first node and the second node of the driving transistor in the first subpixel during the touch mode period corresponds to a voltage difference between the first node and the second node of the driving transistor in the first subpixel during the display mode period.

7. The touch display device according to claim 1, wherein:
during the touch mode period, at least the first pixel electrode in the first subpixel and the second pixel electrode in the second subpixel are selected as a touch electrode;
wherein the first subpixel further includes a first scan transistor, a first node of the first scan transistor is electrically connected to a first node of the driving transistor in the first subpixel, a second node of the first scan transistor is electrically connected to a first scan line among the plurality of scan lines, and a third node of the first scan transistor is electrically connected to a first data line among the plurality of data lines,
wherein the second subpixel further includes a second scan transistor, a first node of the second scan transistor is electrically connected to a first node of the driving transistor in the second subpixel, a second node of the second scan transistor is electrically connected to a second scan line among the plurality of scan lines, and a third node of the second scan transistor is electrically connected to the first data line,
wherein the first scan transistor in the first subpixel is turned off by a first scan signal in a scan signal type for a touch mode having a turn-off level, which is applied to the second node of the first scan transistor, through the first scan line during the touch mode period;
wherein the second scan transistor in the second subpixel is turned off by a second scan signal in a scan signal type for a touch mode having a turn-off level, which is applied to the second node of the second scan transistor, through the second scan line during the touch mode period.

8. The touch display device according to claim 7, wherein:
the reference signal for touch driving is applied to the second node of the driving transistor which is electrically connected to the first pixel electrode; and
the first node of the driving transistor in the first subpixel has a voltage state in which a voltage level is changed in synchronization with the reference signal for touch driving applied to the second node of the driving transistor in the first subpixel.

9. The touch display device according to claim 7, wherein:
a voltage level of the first scan signal in the scan signal type for a touch mode having a turn-off level applied to the second node of the first scan transistor in the first subpixel is changed such that a frequency, a phase, and an amplitude of the first scan signal correspond to those of the reference signal for touch driving, wherein the voltage level of the first scan signal is variable within a turn-off level voltage range; and
a voltage level of the first sense signal in the sense signal type for touch driving having a turn-on level applied to the second node of the first sense transistor in the first subpixel is changed such that a frequency, a phase, and an amplitude of the first sense signal correspond to those of the reference signal for touch driving, wherein the voltage level of the first sense signal is offset from a turn-off level voltage and is variable within a turn-on level voltage range.

10. The touch display device according to claim 7, wherein:
the second sense transistor in the second subpixel is turned on together with the first sense transistor in the first subpixel, and
when the first pixel electrode in the first subpixel is electrically connected to the sensing circuit through the first reference line, a second pixel electrode in the second subpixel is electrically connected to the sensing circuit through the first reference line.

11. The touch display device according to claim 1, wherein:
the plurality of subpixels further include a third subpixel which is electrically connected to a second reference line adjacent to the first reference line and electrically connected to the first sense line; and
during the touch mode period, the second reference line is electrically connected to the sensing circuit together with the first reference line,
the second node of a third sense transistor in the third subpixel is electrically connected to the first sense line together with the second node of the first sense transistor in the first subpixel,
the third sense transistor in the third subpixel is turned on together with the first sense transistor in the first subpixel, and
when the first pixel electrode in the first subpixel is electrically connected to the sensing circuit through the first reference line, a third pixel electrode in the third subpixel is electrically connected to the sensing circuit through the second reference line.

12. The touch display device according to claim 1, wherein:
the plurality of subpixels further include a fourth subpixel which is electrically connected to the first reference line and electrically connected to a third sense line different from the first sense line; and
during the touch mode period, a third sense signal in a sense signal type for load-free driving having a turn-off level is supplied to the third sense line at a timing when the first sense signal in the sense signal type for touch driving having a turn-on level is supplied to the first sense line,
when the first sense transistor in the first subpixel is turned on, a fourth sense transistor in the fourth subpixel is turned off,
when the first pixel electrode in the first subpixel is electrically connected to the sensing circuit through the first reference line, a fourth pixel electrode in the fourth subpixel is not connected to the first reference line, and
a voltage level of the third sense signal in the sense signal type for load-free driving having a turn-off level is changed such that a frequency, a phase, and an amplitude of the third sense signal correspond to those of the first sense signal in the sense signal type for touch driving having a turn-on level, wherein the voltage level of the third sense signal is variable within a turn-off level voltage range.

13. The touch display device according to claim 1, wherein:
the plurality of subpixels further include a fifth subpixel which is electrically connected to a third reference line different from the first reference line and electrically connected to the first sense line; and
during the touch mode period, a fifth sense transistor in the fifth subpixel is turned on together with the first sense transistor in the first subpixel, and
the fifth pixel electrode in the fifth subpixel is connected to the third reference line and the third reference line is not connected to a first pre-amplifier of the sensing circuit.

14. The touch display device according to claim 13, wherein:
when the reference signal for touch driving is applied to the first reference line, a reference signal for load-free driving, of which a frequency, a phase, and an amplitude correspond to those of the reference signal for touch driving, is applied to the third reference line; and
the reference signal for load-free driving is supplied at a position different from that of the reference signal for touch driving.

15. The touch display device according to claim 1, wherein:
the plurality of subpixels further include a fifth subpixel which is electrically connected to a third reference line different from the first reference line and electrically connected to the first sense line; and
during the touch mode period, a fifth sense transistor in the fifth subpixel is turned on together with the first sense transistor in the first subpixel, and
the fifth pixel electrode in the fifth subpixel is connected to the third reference line, and the third reference line is connected to a second pre-amplifier of the sensing circuit.

16. The touch display device according to claim 1, wherein:
the plurality of subpixels further include a sixth subpixel which is electrically connected to a third reference line and electrically connected to a third sense line different from the first sense line; and
during the touch mode period, a third sense signal in a sense signal type for load-free driving having a turn-off level is supplied to the third sense line at a timing when the first sense signal in the sense signal type for touch driving having a turn-on level is supplied to the first sense line, when the first sense transistor in the first subpixel is turned on, a sixth sense transistor in the sixth subpixel is turned off, and the sixth pixel electrode in the sixth subpixel is not connected to the third reference line and the third reference line is not connected to a first pre-amplifier of the sensing circuit.

17. The touch display device according to claim 1, wherein:

each of the plurality of reference lines is shared by K subpixels, wherein K is a natural number greater than or equal to 2;

M reference lines among the plurality of reference lines receive a reference signal for touch driving having a turn-on level at a same timing, wherein M is a natural number greater than or equal to 2;

N sense lines among the plurality of sense lines receive a sense signal for touch driving having a turn-on level at a same timing, wherein N is a natural number greater than or equal to 2; and K*M*N pixel electrodes included in K*M*N subpixels among the plurality of subpixels constitute one touch electrode.

18. The touch display device according to claim 1, wherein the sensing circuit includes:

a pre-amplifier configured to check an electrical state of the first pixel electrode and the second pixel electrode; and a multiplexer configured to control whether or not to connect the first reference line to which the first subpixel and the second pixel electrode is connected to the pre-amplifier or configured to select a type of reference signal to be supplied to the first reference line to which the first subpixel and the second pixel electrode is connected in response to an input selection signal.

19. The touch display device according to claim 18, wherein:

the selection signal is one type of selection signal among a selection signal for a display mode having a constant voltage level, a selection signal for touch driving of which a voltage level is variable within a first voltage range, and a selection signal for load-free driving of which a voltage level is variable within a second voltage range different from the first voltage range; and a frequency, a phase, and an amplitude of each of the selection signal for a display mode and the selection signal for load-free driving correspond to those of the reference signal for touch driving.

20. The touch display device according to claim 1, further comprising a plurality of light shields which are respectively disposed in regions of the plurality of subpixels, wherein a first light shied among the plurality of light shields overlaps with a channel of a driving transistor in the first subpixel and is electrically connected to the first pixel electrode, and wherein a second light shied among the plurality of light shields overlaps with a channel of a driving transistor in the second subpixel and is electrically connected to the second pixel electrode.

21. A touch display device comprising:

a display panel including a plurality of data lines, a plurality of scan lines, and a plurality of subpixels, wherein each of the plurality of subpixels includes a pixel electrode, a driving transistor, a sensing transistor, and a storage capacitor; and a sensing circuit, which is electrically connected to a first pixel electrode included in a first subpixel among the plurality of subpixels via a sensing transistor included in the first subpixel, the sensing circuit configured to apply a reference signal for touch driving of which a voltage level is variable to the first pixel electrode via the sensing transistor that is connected to the first pixel electrode, and senses the first pixel electrode via the sensing transistor to detect touch of the display panel, during a touch mode period.

22. The touch display device of claim 21, further comprising:

a reference line connected to the sensing circuit and the sensing transistor included in the first subpixel, wherein the reference signal is applied to the first pixel electrode via the reference line and the sensing transistor, and the sensing circuit is configured to sense the touch of the display panel based on a sensed capacitance between the pixel electrode and a touch object via the sensing transistor and the reference line.

23. The touch display device of claim 21, wherein during the touch mode period the sensing transistor is turned on and during a display mode period during which an image is displayed on the display panel the sensing transistor is turned off.

24. The touch display device of claim 23, wherein the sensing circuit is configured to apply a reference voltage with a non-variable voltage level to the reference line during the display mode period.

25. The touch display device of claim 23, wherein the driving transistor in the first subpixel is turned-off during the touch mode period and is turned on during the display mode period.

26. The touch display device of claim 23, further comprising a sensing line connected to a gate electrode of the sensing transistor, wherein during the touch mode period a first signal having a first variable voltage level is applied to the gate electrode of the sensing transistor to turn-on the sensing transistor, and during the display mode period a second signal having a second variable voltage level is applied to the gate electrode of the sensing transistor to turn-off the sensing transistor.

\* \* \* \* \*